(12) United States Patent
Smith et al.

(10) Patent No.: US 11,385,951 B2
(45) Date of Patent: Jul. 12, 2022

(54) MONITORING AND ANALYZING WATCHDOG MESSAGES IN AN INTERNET OF THINGS NETWORK ENVIRONMENT

(71) Applicant: McAfee, LLC, San Jose, CA (US)

(72) Inventors: Ned M. Smith, Beaverton, OR (US); Thiago Jose Macieira, Portland, OR (US); Zheng Zhang, Portland, OR (US); Tobias M. Kohlenberg, Portland, OR (US); Igor G. Muttik, Berkhamsted (GB)

(73) Assignee: McAfee, LLC, San Jose, CA (US)

(*) Notice: Subject to any disclaimer, the term of this patent is extended or adjusted under 35 U.S.C. 154(b) by 446 days.

(21) Appl. No.: 16/260,923

(22) Filed: Jan. 29, 2019

(65) Prior Publication Data

US 2019/0171510 A1    Jun. 6, 2019

Related U.S. Application Data

(63) Continuation of application No. 15/278,923, filed on Sep. 28, 2016, now Pat. No. 10,191,794.

(51) Int. Cl.
*G06F 11/07* (2006.01)
*H04L 43/0805* (2022.01)
(Continued)

(52) U.S. Cl.
CPC ........ *G06F 11/0757* (2013.01); *G06F 11/079* (2013.01); *G06F 11/0751* (2013.01);
(Continued)

(58) Field of Classification Search
CPC .... G06F 11/30; G06F 11/0757; G06F 11/079; G06F 11/0751; H04L 43/10; H04L 67/12; H04L 43/04; H04L 43/0805; H04L 43/16
See application file for complete search history.

(56) References Cited

U.S. PATENT DOCUMENTS

| 7,502,463 | B2 | 3/2009 | Qi et al. |
| 7,769,885 | B1 | 8/2010 | Kompella |

(Continued)

OTHER PUBLICATIONS

Ahmed, et al., "Machine Learning Approaches to Network Anomaly Detection," 15 pages; retrieved on Dec. 30, 2016 from https://www.usenix.org/legacy/event/sysml07/tech/full_papers/ahmed/ahmed_html/, Published Apr. 10, 2007; Journal Proceedings of the 2nd USENIX workshop on Tackling computer systems problems with machine learning techniques; Publisher USENIX Associate.

(Continued)

*Primary Examiner* — Jigar P Patel
(74) *Attorney, Agent, or Firm* — Patent Capital Group

(57) ABSTRACT

There is disclosed in one example a network device, including: a hardware platform including at least a processor and a memory; a communication interface; and stored instructions on the memory to instruct the processor to provide a health monitoring engine (HME) configured to: communicatively couple to a network via the network interface; construct a reference template during a training period; observe watchdog behavior on the network during an observation period; identify an abnormality in the watchdog behavior including a substantial variance from the reference template; and trigger a resilience response to the substantial variance.

19 Claims, 16 Drawing Sheets

(51) Int. Cl.
*H04L 43/10* (2022.01)
*H04L 43/04* (2022.01)
*H04L 43/16* (2022.01)

(52) U.S. Cl.
CPC .......... *H04L 43/04* (2013.01); *H04L 43/0805* (2013.01); *H04L 43/10* (2013.01); *H04L 43/16* (2013.01)

(56) References Cited

U.S. PATENT DOCUMENTS

| | | | |
|---|---|---|---|
| 8,184,390 B1 | 5/2012 | Xia et al. | |
| 10,129,114 B1* | 11/2018 | Kowalski | H04L 69/40 |
| 2008/0049013 A1 | 2/2008 | Nasle | |
| 2009/0006885 A1 | 1/2009 | Pattabhiraman et al. | |
| 2013/0124607 A1* | 5/2013 | Griffith | G06F 11/0757 709/203 |
| 2015/0019671 A1 | 1/2015 | Yasuda et al. | |
| 2015/0304880 A1* | 10/2015 | Kotecha | H04W 76/27 455/437 |
| 2017/0099353 A1* | 4/2017 | Arora | H04L 67/22 |
| 2018/0025287 A1* | 1/2018 | Mathew | G06N 5/04 706/12 |
| 2018/0089014 A1 | 3/2018 | Smith et al. | |

OTHER PUBLICATIONS

International Search Report and Written Opinion issued in PCT/US2017/053351 dated Jan. 22, 2018; 18 pages.

International Telecommunication Union (ITU-T), "Overview of the Internet of things," Y.2060, Jun. 2012, 22 pages; retrieved on Dec. 30, 2016 from file:///C:/Users/admin/AppData/Local/Packages/Microsoft.MicrosoftEdge_8wekyb3d8bbwe/TempState/Downloads/T-REC-Y.2060-201206-I!!PDF-E.pdf.

Li, et al., "A Machine Learning Approach for Efficient Traffic Classification," Proceedings of the 2007 15th International Symposium on Modeling, Analysis, and Simulation of Computerand Telecommunications Systems, Oct. 24-26, 2007, 8 pages; retrieved on Dec. 30, 2016 from http://www.cl.cam.ac.uk/~awm22/publications/li2007machine.pdf.

Mill, "Bloom Filters by Example," May 27, 2011, 4 pages; retrieved on Dec. 30, 2016 from http://llimllib.github.io/bloomfilter-tutorial/.

Sommer, et al., "Outside the Closed World: On Using Machine Learning for Network Intrusion Detection," Proc. IEEE Symposium on Security and Privacy, 2010, 12 pages; retrieved on Dec. 30, 2016 from http://www.utdallas.edu/~muratk/courses/dmsec_files/oakland10-ml.pdf.

* cited by examiner

US 11,385,951 B2

MONITORING AND ANALYZING WATCHDOG MESSAGES IN AN INTERNET OF THINGS NETWORK ENVIRONMENT

CROSS-REFERENCE TO RELATED APPLICATIONS

This application is a continuation of, and claims priority to, U.S. Non-Provisional application Ser. No. 15/278,923, filed 28 Sep. 2016, titled "Monitoring and Analyzing Watchdog Messages in an Internet of Things Network Environment." The above related application is incorporated herein by reference in its entirety.

TECHNICAL FIELD

This disclosure relates in general to the field of Internet of Things (IoT) networks, and more particularly, to monitoring and analyzing watchdog messages in an Internet of Things (IoT) network environment.

BACKGROUND

Industrial connected embedded devices are currently some of the most complex automation systems in existence. The Internet-of-Things (IoT) trend may further compound this complexity through inter-connecting control and automation networks to Internet gateways, analytics, and distributed ledgering systems. Industrial automation and autonomous systems often perform safety critical functions that may result in harm to humans, ecology or property if these systems fail. Examples of safety critical functions can include, but are not limited to, handling toxic chemicals, generating nuclear power, self-driving vehicles, and using medical equipment. Typically, Internet and Web technology has been associated with networks supporting browsing, searching, and social media activities. Consequently, survivability has not been a critical issue. Significant challenges remain to provide survivability and resilience capabilities for connected devices over Internet and Web technologies.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Figure 1:
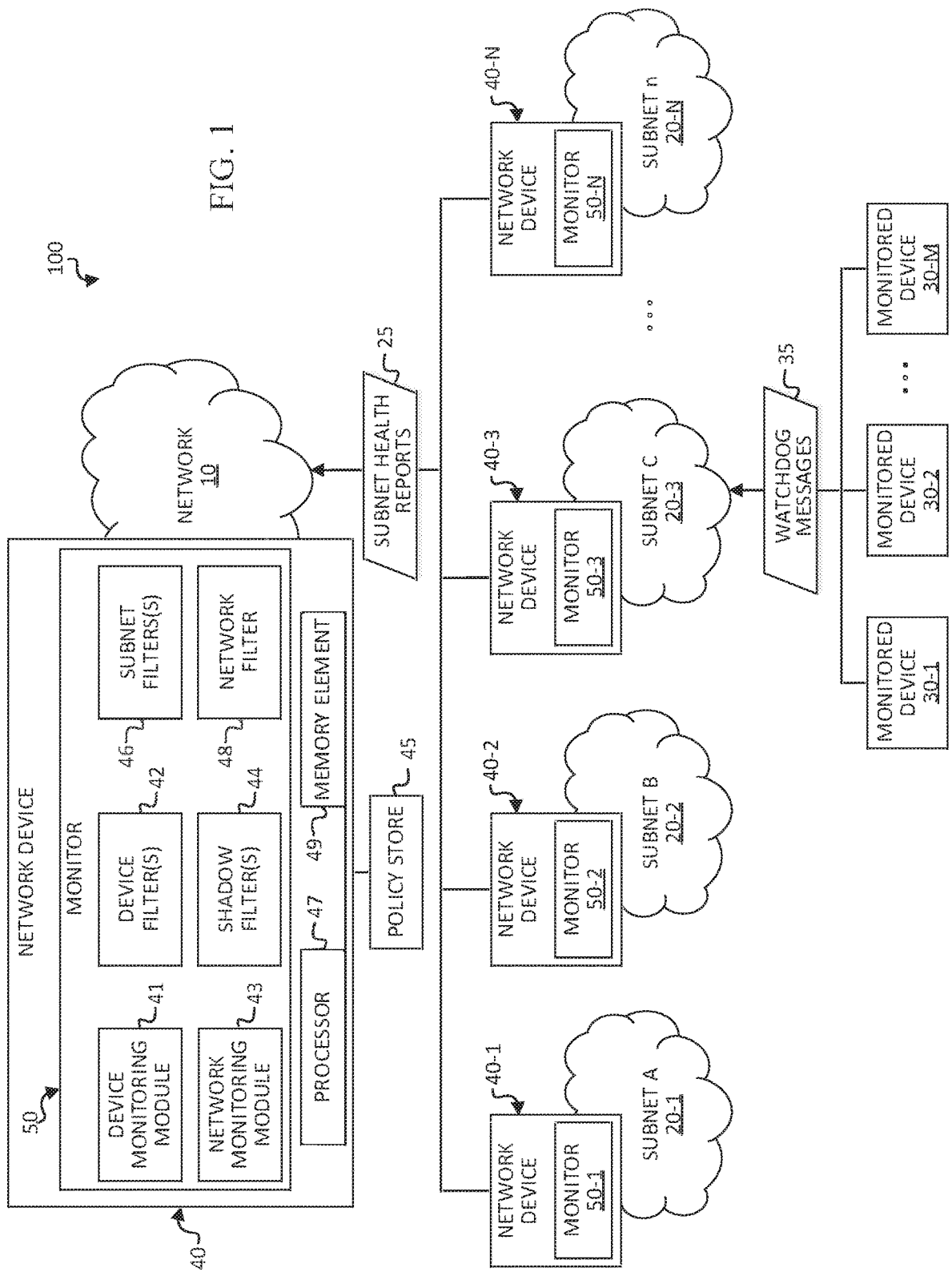
FIG. 1 is a simplified block diagram of a communication system for monitoring and analyzing a network in accordance with an embodiment of the present disclosure.

FIG. 1 is a simplified block diagram of an example communication system 100 for monitoring and analyzing watchdog messages in an Internet of Things (IoT) network environment. FIG. 1 includes an example hierarchical topology of an IoT network including a network 10 and its sub-networks (also referred to herein as 'subnets') 20-1 through 20-N containing IoT monitored devices. Monitored devices may be provisioned throughout network 10, including subnets 20-1 through 20-N. By way of example, monitored devices 30-1 through 30-M are shown receiving network connectivity via subnet C 20-3. Network devices can also be provisioned throughout network 10 and subnets 20-1 through 20-N. For example, network device 40 is provisioned in network 10, and network devices 40-1 through 40-N are provisioned, respectively, in subnets 20-1 through 20-N. Network device 40 shows possible details that may be associated with other similar network devices (e.g., 40-1 through 40-N) including, but not limited to, device filters 42, shadow filters 44, subnet filters 46, network filters 48, a device monitoring module 43, a network monitoring module 45, a processor 47 and a memory element 49. Network devices such as network device 40 may also include, or have access to, a policy store 45.

Network communications within communication system 100 can include watchdog messages 35 being sent from monitored devices 30-1 through 30-M to network device 40-3 in subnet C 20-3. Additionally, subnet health reports 25 can be sent from network devices 40-1 through 40-N of the subnets to network device 40 of network 10. It should also be noted that, although monitored devices 30-1 through 30-M represent endpoints or other objects connecting to network 10 via subnet C 20-3, any devices provisioned throughout communication system 100 can be configured to produce watchdog messages and communicate the messages to an appropriate network device. For example, network devices 40 and 40-1 through 40-N may also produce watchdog messages.

For purposes of illustrating certain example techniques of monitoring and analyzing watchdog messages in an IoT network environment, it is important to understand the communications that may be traversing the network environment. The following foundational information may be viewed as a basis from which the present disclosure may be properly explained.

Generally, the Internet of Things (IoT) is a global network of nodes. The term 'node' as used herein, includes cyber, physical, and virtual objects that are provisioned with network addresses (e.g., Internet Protocol (IP) addresses) for Internet connectivity to enable these objects to communicate with each other and other Internet-enabled devices and systems. Physical objects and virtual objects in an IoT network can include any natural or man-made object that is capable of being identified, that can be assigned a network address (e.g., IP address), and that can be provisioned with the capability of communicating over a network.

Examples of nodes in a IoT network include embedded devices and sensors in, for example, medical devices, automobiles, transportation infrastructure, energy production and delivery infrastructure, factories, schools, homes, farms, enterprises, government entities, etc. Other nodes in the IoT network can include more traditional computing systems such as mobile devices (e.g., laptops, smart phones, tablets, gaming systems, automobile infotainment systems, etc.), computing devices (e.g., desktop, etc.), network elements (e.g., routers, gateways, switches, appliances, servers, etc.), and many more. In a particular example, physical and virtual objects may be provisioned in control and automation networks. Such systems may perform safety critical functions that could result in harm to humans, ecology or property if these systems fail.

In current systems, Extensible Messaging and Presence Protocol (XMPP) (also referred to as 'Jabber') messaging standards can be used to send notifications when a network participant's status changes. These messaging standards, however, are designed to monitor user activity. Furthermore, they expect underlying system software to remain functional. Thus, its ability to indicate web presence is limited and not useful for monitoring the health of a network.

Existing systems based on Web technology do not have an implicit notion of device or system health. Instead, health of a system or device is achieved using monolithic manageability protocols that expose management applications and services. Furthermore, these manageability systems typically implement security within the manageability systems resulting in additional complexity needed to configure and maintain the security. A health monitoring data structure is needed that is independent of manageability protocols, that can be delivered by any IoT application or framework, and that does not have the complexity of current manageability protocols that implement security.

A strategy for detecting system failures relies on originating nodes sending periodic "watchdog presence messages" (also referred to herein as "watchdog messages") to notify other nodes of the originating nodes' presence in the network. In at least one example, a watchdog message can be a binary message indicating that an object is present and functioning in the network. Failure to receive a watchdog message may be an indication of a failure state, such as a node failure or network outage. In an Internet of Things, however, where a network or sub-network could contain tens of thousands of devices that send watchdog messages, these watchdog messages could quickly overwhelm the network, especially if the period of time between the messages is short (e.g., seconds, etc.). Therefore, efficient and intelligent processing of watchdog traffic is needed to help make IoT systems resilient and survivable. Additionally, resilient systems could benefit from redundancy and early detection of possible problems. Survivable systems could benefit from redundancy and the ability to dynamically re-route, re-task, and re-provision to restore safety critical operations using remaining resources.

In addition to resilience and survivability, at least some IoT networks require high reliability and availability. For example, a mission critical IoT network can include objects that perform safety critical functions. Examples of mission critical networks include, but are not limited to networks of manufacturing automation robots, self-driving vehicles, medical equipment, utilities, military operations, energy production and supply, etc. At least some of these IoT networks need the capabilities of quickly and reliably identifying system failures.

Embodiments described herein can resolve the aforementioned issues (and more) associated with monitoring and analyzing watchdog messages in an IoT network environment. In communication system 100, Internet connected nodes (e.g., monitored devices 30-1 through 30-M, network devices 40 and 40-1 through 40-N) can report resilience and survivability health measured in terms of node presence and availability to perform a service. The nodes generate watchdog presence messages. Presence of the nodes is established by delivering unsolicited watchdog messages to network devices tasked with collection and processing of health reports. The watchdog messages can be efficiently processed by a mesh of network devices that, in essence, report on the health of the communication system 100 or a portion thereof (e.g., one or more subnets). In at least one embodiment, a method of efficient collection and analysis of health may use bloom filters (e.g., device filters, shadow filters, subnet filters, and network filters), which are easily updated and maintained by network devices, while also facilitating timely detection of devices failing to report health status. In at least one embodiment, the device filters may be implemented as sparse arrays. Other filters may also be implemented as sparse arrays.

In more particular embodiments, a monitor of a network device can receive watchdog messages from one or more nodes. For each reporting device, the monitor allocates bits for each time interval within which watchdog messages from that reporting device may arrive. The total number of bits can match a sample rate of the time interval. The bits are reset when the interval expires. Reset also may cause a bit in a higher order time interval to be recorded such that if at least one bit was logged in the low-order time interval, it is recorded as receipt of the message to the higher order interval. Multiple higher order intervals may be provided. A shadow filter may be used to capture anomaly patterns such as cases where a bit position recurrently is missed. The shadow filter records misses that would otherwise be erased by the filter reset of a device filter that normally occurs when an interval expires based on the interval's rollover frequency. A shadow filter can be initialized with all ones ('1') and then a logical AND operation can be applied to at least a bit sequence of the low-order interval of the device filter and corresponding bits in the shadow filter prior to being reset. A logical AND operation can also be applied to any bits in higher order intervals of the device filter that are affected by the expiration of the low-order interval and corresponding bits in the shadow filter.

Health can be monitored efficiently across a larger network by monitors of network devices consuming local watchdog traffic, while making health report filter values available more widely. Health of a sub-system (e.g., a subnet) of nodes can be coalesced by combining the shadow filter results for each reporting device in the subnet. In at least one embodiment, a logical AND operation can be applied to each subnet filter and the network health report. The health report indicates where device presence has been inconsistent during the network health reporting period. A heat map may be created using the health report for better visualization. Additionally, drill-down can be achieved by displaying the heat map for subnet filters and device shadow filters.

Embodiments can also include a health monitoring engine (HME) that receives heartbeat messages from nodes (e.g., monitored devices 30-1 through 30-M, network devices 40 and 40-1 through 40-N) within an IoT network. Heartbeat messages are a type of watchdog message that contain additional information. For example, heartbeat messages may contain a device identifier ('device ID'), a local time stamp, a next heartbeat time, a node health and diagnostic information, and a watchdog report from a subordinate node or network of nodes (e.g., subnet). The HME can use machine learning (ML) techniques to form a reference template by monitoring actual heartbeat messages during a training period and by being informed of expected watchdog messages or a schedule of watchdog messages using a data model. The reference template can then be used during normal operation where the HME evaluates variances and thresholds that may trigger a pro-active and prescriptive response to improve network resilience properties prior to node or network failures.

Several advantages are provided by communication system 100 for monitoring watchdog messages. Embodiments described herein enable nodes of an IoT network environment to be used together to discover, diagnose and respond to system failures that may be malicious or accidental, where failure or inability to respond correctly may result in physical harm measured in terms of loss of life, injury, property loss or damage to an environment or ecosystem. Communication system 100 defines a health monitoring data structure that is independent of manageability protocols and can be delivered by any IoT application or framework. In addition, communication system 100 provides resilience and survivability capabilities to Internet and Web networks through the use of efficient watchdog message handling. Health reporting is made more efficient by embodiments configured to track and preserve watchdog failures for subsequent observation and analysis. Embodiments described herein can produce a resilient system, in which health reports can be used to discover devices exhibiting sporadic and unreliable reporting. Accordingly, system designers may increase redundancy, improve device hardening, and improve network bandwidth. Survivability is also facilitated using health reports that identify nodes and subnets that have failed or are unreliable such that survivability failover actions can be informed by dynamic failure intelligence.

Other embodiments of communication system 100 also provide advantages. For example, generally, machine learning is used in networks to check for intrusion anomalies for the purpose of improving network security or to classify network traffic 'flows' in an attempt to find bottle necks. Embodiments of communication system 100, however, use machine learning to monitor watchdog messages as a method for dynamic prediction of network resiliency properties and proactive responses. In current systems, watchdog messages are generally expected to arrive at constant intervals. If one or multiple consecutive watchdog messages from a device are missed, the device may be marked as lost or a candidate for redundant employment. Embodiments of communication system 100, however, can monitor observed traffic of heartbeat messages, access a data model prescribing an expected behavior, and weight the variance from expected and observed behavior against a real time template value. Heartbeat messages are a form of watchdog messages that contain additional information related to the node generating the message. Finally, intermittent nodes such as, for example, self-driving cars that may constantly move around and operate as sleepy low-power sensors that mostly stay in a sleep mode and sporadically wake up, can affect watchdog messages. At least one embodiment can anticipate the affect intermittent nodes have on watchdog messages and correct it using, for example, a shadow filter.

Overall, embodiments described herein for health reporting and monitoring in IoT networks enable IoT networks to accommodate applications where resiliency and/or survivability are important. Embodiments described herein allow health monitoring to be implemented using existing IoT framework infrastructure and messaging. Thus, health reports can be a true reflection of the health of the framework and infrastructure used for regular IoT workloads. Existing manageability systems that also implement watchdog reporting do not report on the health of the production system.

Turning to FIG. 1, a brief discussion is now provided about some of the possible infrastructure that may be included in communication system 100. Generally, communication system 100 can be implemented in any type or topology of networks. Network 10 and its subnets 20-1 through 20-N represent a series of points or nodes of interconnected communication paths for receiving and transmitting packets of information that propagate through communication system 100. Network 10 and subnets 20-1 through 20-N offer a communicative interface between nodes (e.g., monitored devices 30-1 through 30-M, network devices 40 and 40-1 through 40-N, etc.). The network and its subnets may include any type or topology of one or more networks such as a local area network (LAN), wireless local area network (WLAN), metropolitan area network (MAN), virtual local area network (VLAN), Intranet, Extranet, wide area network (WAN) such as the Internet, virtual private network (VPN), any other appropriate network configuration or system, or any suitable combination thereof that facilitates communications in a network environment. These networks may be inclusive of any number of wire line and wireless technologies, including satellite, cellular, and other radio frequencies, for example.

Communications in communication system 100 are also referred to herein as 'network traffic' or 'traffic'. In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)).

A packet is a unit of data that can be routed between a source node and a destination node in a network environment. A packet includes a source network address and a destination network address, and may also contain data. By way of example, these network addresses can be Internet Protocol (IP) addresses in a TCP/IP messaging protocol. The term 'data' as used herein, refers to any type of binary, numeric, voice, video, textual, or script data, or any type of source or object code, or any other suitable information in any appropriate format that may be communicated from one point to another in computing systems and/or networks. Additionally, messages, requests, responses, reports, and queries are forms of network traffic, and therefore, may comprise packets, frames, signals, data, etc.

Monitored devices in communication system 100 represent nodes that can send a watchdog message (e.g., a beacon or notification) to another node, such as network devices 40 or 40-1 through 40-N. For example, monitored devices 30-1 through 30-M are communicatively coupled to subnet C 20-3 and can periodically send watchdog messages 35 to network device 40-3 in subnet C 20-3. Watchdog messages can be generated and sent by each monitored device according to that device's watchdog reporting schedule. Examples of watchdog reporting schedules include, but are not limited to, reporting every second, every minute, hourly, daily, weekly, monthly, yearly, etc. In at least one embodiment, a watchdog message can be a binary indication that the device is present in the network and functioning. The failure to receive an expected watchdog message or the absence of a watchdog message from a node can be an indication of a failure state of the node. A failure state can include, but is not limited to, node failure or network outage. Watchdog messages and the absence of watchdog messages that are expected to be received from monitored devices 30-1 through 30-M can be monitored and analyzed by monitor 50-3 of network device 20-3. It should be noted that, although certain embodiments may be described herein with reference only to watchdog messages, these embodiments could be implemented to process heartbeat messages instead of (or in addition to) watchdog messages to achieve the intended functionality.

Network devices 40 and 40-1 through 40-N are network elements that include respective monitors 50 and 50-1 through 50-N for monitoring and analyzing watchdog messages. As used herein, the term 'network element' is meant to encompass routers, switches, gateways, bridges, load balancers, firewalls, inline service nodes, proxies, servers, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

In one implementation, network devices 40 and 40-1 through 40-N include software to achieve (or to foster) the monitoring and analyzing functions, as outlined herein. Note that in one example, each of these elements can have an internal structure (e.g., processor 47, memory element 49, etc.) to facilitate some of the operations described herein. In other embodiments, these monitoring and analyzing functions may be executed externally to these elements, or included in some other network element to achieve this intended functionality. Alternatively, network devices 40 and 40-1 through 40-N may include this software (or reciprocating software) that can coordinate with other network elements in order to achieve the operations, as outlined herein. In still other embodiments, one or several network elements may include any suitable algorithms, hardware, software, firmware, components, modules, interfaces, or objects that facilitate the operations thereof.

In some implementations, network devices can be routers that define sub-networks (also referred to herein as 'subnets') of nodes, such as monitored devices 30-1 through 30-M In at least some implementations, and the subnets may be provisioned in a hierarchical topography. Each network device can produce a local health status report that represents the health of the subnet. In addition, at least some network devices can receive health status reports from other subnets. For example, network device 40-3 may produce its own local health status report that represents the health of subnet 20-3, which includes monitored devices 30-1 through 30-M. Network device 40 may produce its own local health status report that represents the health of one or more nodes (not shown), in addition to receiving subnet health status reports from subnets 20-1 through 20-3. It should be noted that FIG. 1 is merely an example of a possible configuration of communication system 100 and that any number of subnets and hierarchical subnet levels could be provisioned in other implementations of communication system 100.

In at least some embodiments, monitors 50-1 through 50-N of network devices 40-1 through 40-N in communication system 100 may be configured in the same or similar manner as illustrated by monitor 50 of network device 40. Example operational features of monitor 50 will now be described with reference to network device 40, which is provisioned in network 10. It should be apparent, however, that these operations can be similarly applicable to other monitors in network devices throughout communication system 100.

Device monitoring module 43 can produce a local health status report for one or more nodes (not shown) connected to network device 40 and configured to produce watchdog messages. The local health status report (e.g., subnet filter 46) may also include failure information from network device 40 if it is configured to produce watchdog messages. Device monitoring module 43 can use device filter 42 (e.g., sparse array) for the one or more nodes, where the device filter is organized according to the intended watchdog reporting schedules of the one or more nodes. Device monitoring module 43 can be configured to appropriately update the device filter when watchdog messages are received from, or fail to be received from, the one or more nodes during their reporting time intervals. Network device 40 may include multiple device filters in at least some implementations. It should be noted that a monitor of a network device of a subnet, such as monitor 50-3 of network device 40-3 of subnet C 20-3, can function in a similar manner as monitor 50 of network device 40. For example, monitor 50-3 can produce a local health status report (e.g., a subnet filter) for the nodes in its subnet, such as monitored devices 30-1 through 30-M.

Device monitoring module 43 can also update a shadow filter 44, to preserve failure information associated with a node after a reporting time interval for the node expires. Failure information can include a failure state (e.g., node failure, power outage, etc.), and can be indicated in a device filter associated with the node based on watchdog messages that should have been sent by the node during a reporting time interval, but which were not received by the network device. A no failure state (e.g., node is present and functioning in the network) can be indicated in the device filter based on watchdog messages that were expected from and received by the node during the reporting time interval. Indications of failure states in the device filter that were captured during a reporting time interval can be preserved in the shadow filter once the reporting time interval expires. In at least some embodiments, multiple shadow filters may be produced by a network device.

One or more shadow filters created by a network device for a subnet, can be combined into a subnet filter to create a health report for the subnet that includes the nodes. The subnet filter can be a bloom filter, which may be implemented as a sparse array in at least one embodiment, and can be propagated to another network device, depending on the topology of the network. For example, a subnet filter produced in any one of subnets 20-1 through 20-N could be propagated to network device 40 of network 10 as subnet health reports 25. A subnet filter produced by network device 40, however, could be combined with other subnet health reports 25 received by network 10 from other subnets (e.g., subnets 20-1 through 20-N) into network filter 48 to create an overall health status report for network 10. This network filter could include health information from all subnets in the network that contain reporting nodes. Thus, network filter could include health information for all reporting nodes in communication system 100.

In embodiments described herein, health filters (e.g., device filters, shadow filters, subnet filters, network filters, etc.) can be updated by any part of the system that can generate watchdog messages. In a particular example, network device 40-3 (and other network devices) may also be configured to produce watchdog messages. In this scenario, network device 40-3 could send its own watchdog messages to monitor 50-3 to be monitored and analyzed along with watchdog messages from monitored devices 30-1 through 30-M. Alternatively, network device 40-3 could send its watchdog messages to a monitor that is not co-located such as, for example, network device 40 in network 10.

Figure 2:
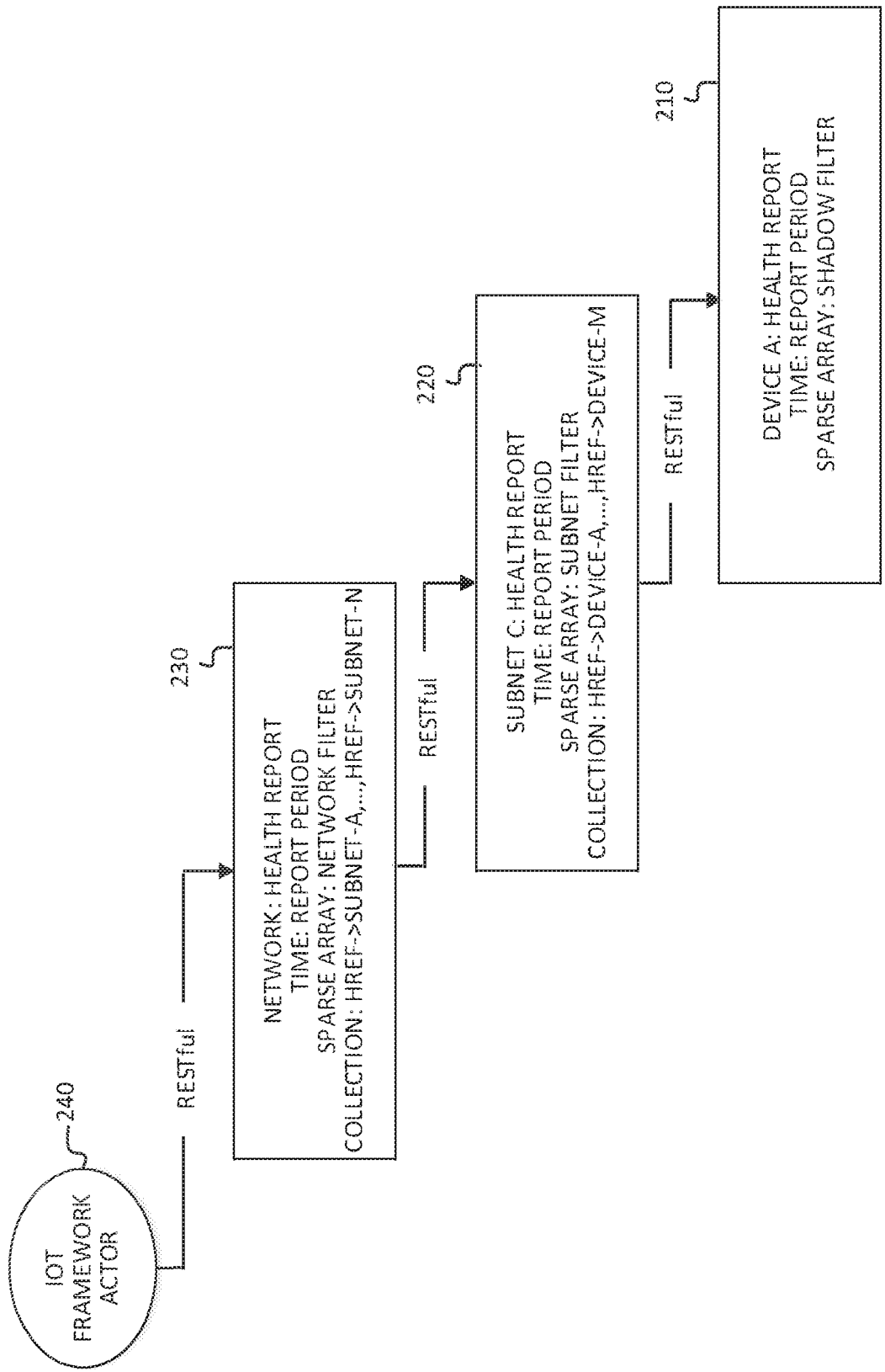
FIG. 2 is a simplified block diagram illustrating an Internet of Things (IoT) framework messaging infrastructure used in at least one embodiment of the communication system according to the present disclosure.

Turning to FIG. 2, FIG. 2 is a simplified block diagram illustrating some possible communications of communication system 100, which can implement a representational state transfer (RESTful) protocol. Health reports can be generated based on watchdog messages, which can be communicated using RESTful interactions. Health reporting may be implemented using existing IoT framework infrastructure for delivering normal IoT network traffic. This can be achieved by defining health status using industry standard IoT resources following the RESTful protocol semantics of the Internet. RESTful protocol behavior can be facilitated by an object model that allows health reports to be produced by a device entity and then published through the IoT framework's resource interface. For example, Open Connectivity Forum (OCF) defines such a framework object model.

In at least one embodiment, bloom filters can be implemented as sparse arrays that provide information about how the network is working. The bloom filters that provide health information about a subnet or a network that includes the subnets are also referred to herein as 'health reports'. At least some of these health reports (e.g., subnet health reports) can be propagated to other network devices in the network to be combined for a broader picture of the network or a portion of the network. A layer of control traffic may precede content delivery of watchdog messages and health reports in communication system 100.

Block 210 of FIG. 2 represents a particular node, device A (e.g., monitored device 30-1), of communication system 100. Device health information (e.g., indications of failure states and/or no failure states associated with the device) can be derived during each successive reporting time interval of device A from the receipt of expected watchdog messages or the absence of expected watchdog messages from device A. A shadow filter can be created and updated at the expiration of each reporting time interval for device A. The shadow filter represents the health report of device A. If the shadow filter combines information from other monitored devices, then the shadow filter represents the health report of device A and those other monitored devices.

Block 220 of FIG. 2 represents a subnet C 20-3 of communication system 100. Subnet health information (e.g., indications of failure states and/or no failure states associated with the devices in the subnet) can be derived from the health reports of nodes in the subnet, including device A. Shadow filters can be collected for all of the nodes in the subnet. A subnet filter can be created and updated at the expiration of a report period, based on the shadow filters of the nodes (e.g., monitored device 30-1 through monitored device 30-M). The subnet filter represents the health report of subnet C.

Block 230 of FIG. 2 represents network 10 of communication system 100. Network health information (e.g., indications of failure states and/or no failure states associated with the subnets) can be derived from the health reports of subnets, including subnet C. Subnet filters can be collected for all of the subnets with reporting nodes. A network filter can be created and updated at the expiration of a report period, based on the subnet filters of the subnets (e.g., subnet A 20-1 through subnet n 20-N). The network filter represents the health report of network 10, which includes all of the subnets with reporting nodes.

IoT framework actor 240 represents a console through which a user or automated system can access the health reports of the network, the subnets, and/or the nodes. When devices fail or network outages occur in communication system 100, these failures can be indicated in the network health report. IoT framework actor 240 can observe these indications and perform queries to determine more detailed information about the location and frequency of the failures. Thus, the significance of failure indications in a network health report can be ascertained.

Figure 3:
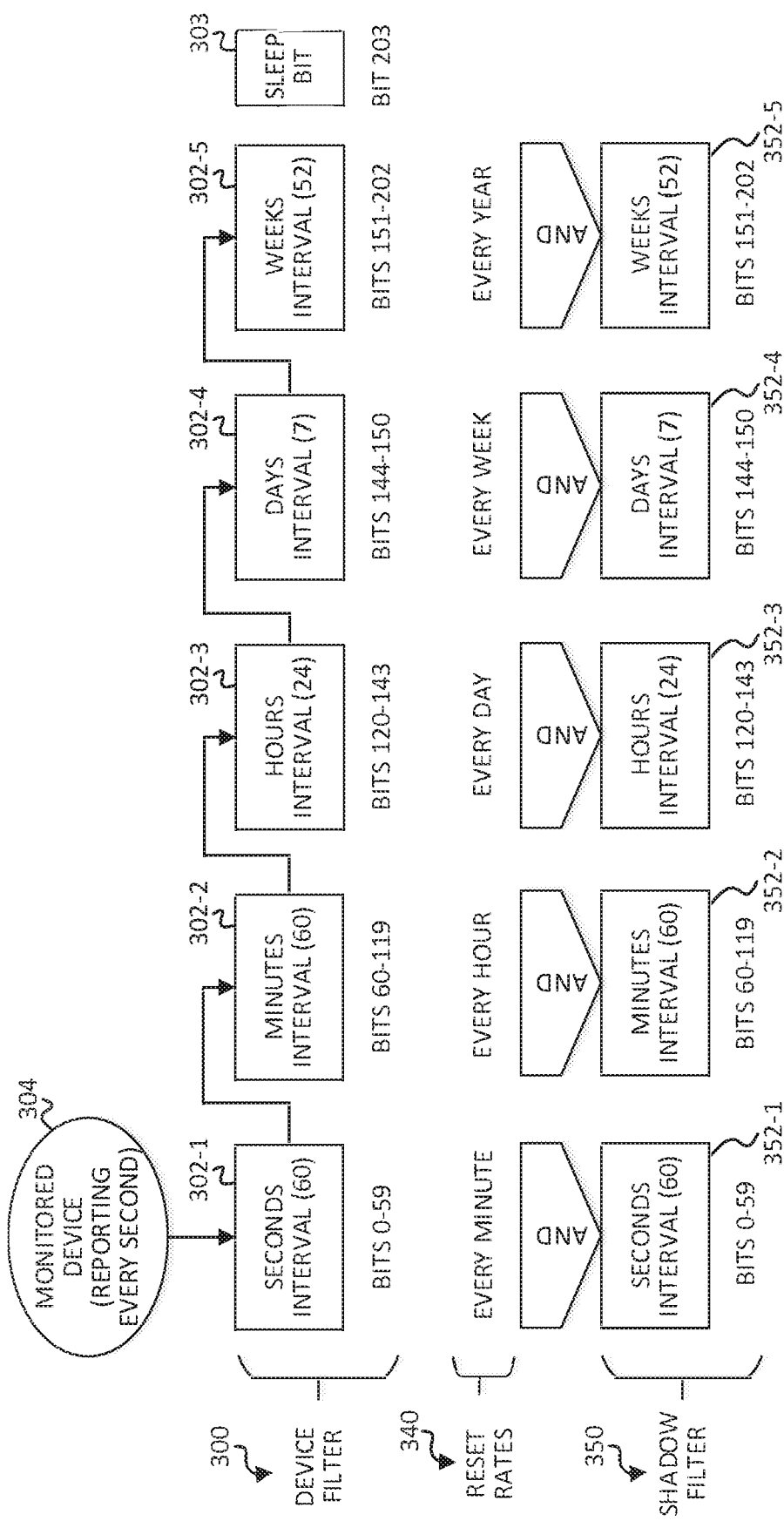
FIG. 3 is a simplified block diagram of example device and shadow filters that may be used in the communication system according to an embodiment.

FIG. 3 is a block diagram illustrating an example device filter 300 and shadow filter 350 that may be generated by a monitor of a network device of communication system 100 in an example scenario. A network device, such as network devices 40 and 40-1 through 40-N, can produce a health status report for one or more nodes using a device filter organized according to the intended watchdog reporting schedules for the nodes. For example, network device 20-3 can produce a health status report for monitored nodes 30-1 through 30-M, and possibly network device 20-3 itself. Watchdog schedules establish the expected bloom contents for a given device or device type. Example device filter 300 is illustrated for a schedule of interest that monitors seconds, minutes, hours, days, and weeks of watchdog messages (and the absence of watchdog messages) from one or more nodes. There is no restriction on how many higher or lower orders of time quantization may exist in the filter, but it may be practically limited by available resources and capabilities. Also, different reporting schedules of the nodes may call for different time intervals. Accordingly, finer or coarser time granularity may be provided in the device filter.

One or more nodes may have watchdog reporting schedules that require the nodes to generate watchdog messages every second, as illustrated in FIG. 3. A device filter, however, could accommodate multiple nodes having different watchdog schedules. For example, monitored device 30-1 could report every second, monitored device 30-2 could report every hour, and monitored device 30-3 could report every day. Information indicating watchdog messages were received or not received for all three of the monitored devices could be captured in a single device filter such as device filter 300. For ease of illustration and description, however, FIG. 3 will be described with reference to a single node, monitored device 304, reporting every second, which is captured in device filter 300.

In device filter 300, a bit sequence is allocated for each time interval being monitored according to a watchdog schedule of monitored device 304. Device filter 300 includes a first bit sequence of sixty bits (bits 0-59) for a seconds interval 302-1, a second bit sequence of sixty bits (bits 60-119) for a minutes interval 302-2, a third bit sequence of twenty-four bits (bits 120-143) for an hours interval 302-3, a fourth bit sequence of seven bits (bits 144-150) for a days interval 302-4, and a fifth bit sequence of fifty-two bits (bits 151-202) for a weeks interval 302-5. In this example, seconds interval 302-1 is the reporting time interval during which a watchdog message is expected to arrive every second from monitored device 304. A bit is allocated for each time period (e.g., one second) in the reporting time interval (e.g., 60 seconds). Thus, the total number of bits in the bit sequence of the reporting time interval can match a sample rate (e.g., 60 seconds) of the reporting time interval. Bit sequences corresponding to higher order time intervals are referred to herein as 'higher order bit sequences'. Each of the higher order bit sequences may include a total number of bits matching a sample rate (e.g., 60 minutes, 24 hours, 7 days, 52 weeks, etc.) of its associated higher order time interval. Device filter 300 may also include a sleep bit 303 (bit 203).

An internal clock of the network device receiving the watchdog messages determines which bit position(s) in device filter 300 to use. Device and network latencies may cause watchdog messages to arrive at different times and in a different order. Such behavior is still useful in terms of resiliency. In one possible implementation, device filter 300 is initialized to zero. The first (beginning) bit position in the bit sequence of the reporting time interval (e.g., bit 0 of seconds interval 302-1) is identified as the current bit position of the bit sequence. Similarly, the first bit positions in the higher order bit sequences of higher order time intervals (e.g., bit 60 of minutes interval 302-2, bit 120 of hours interval 302-3, bit 144 of days interval 302-4, bit 151 of weeks interval 302-5) can be identified as the current bit positions of those higher order bit sequences. The current bit positions of the higher order bit sequences are also referred to herein as 'rollover bit positions'.

In at least one implementation, a bit in the current bit position in the reporting time interval bit sequence is set to TRUE (i.e., 1) if a watchdog message is received before the bit position changes or before the reporting interval (e.g., 60 seconds in this scenario) expires. In this example implementation, setting a bit to TRUE indicates a no failure state for the time period corresponding to the current bit (e.g., $1^{st}$ second, $2^{nd}$ second, etc.) As the clock continues, each successive bit position in the bit sequence may be identified as the current bit position of the bit sequence. A bit in each current bit position may be set to TRUE if a watchdog message is received before the current bit position changes or before the reporting time interval expires.

In some scenarios, one or more watchdog messages may arrive after or before the one second time period in which they are expected to arrive expires. This potential burstiness behavior can be accommodated by allowing the appropriate bits in the bit sequence to be set to TRUE as long as watchdog messages for the bit positions are received before the reporting time interval expires (e.g., 60 seconds). Consequently, a burst of bits that are received prior to the expiration of a reporting time interval (e.g., 60 seconds) can be used to set the bits (e.g., bits 0-59) to TRUE in the bit sequence of the device filter.

Once the last second in the reporting time interval passes, a rollover event can occur. In a rollover event, if any of the bits in the reporting time interval bit sequence are set to TRUE, then a bit in the current bit position of the next higher order bit sequence can be set to TRUE to indicate a no failure state at the time period corresponding to the current bit (e.g., $1^{st}$ minute, $2^{nd}$ minute, etc. of a 60 minute interval). If no watchdog messages were received during the reporting time interval and no bits are set to TRUE in the reporting time interval bit sequence, then the bit in the current bit position of the next higher order bit sequence can remain FALSE (i.e., 0) to indicate a failure state at the time period corresponding to the current bit. In the present example, upon the expiration of the seconds interval, if any bits in the bit sequence of the seconds interval are set to TRUE, then a bit can be set to TRUE in the current bit position in the minutes interval bit sequence. However, if every bit in the bit sequence of the seconds interval is set to FALSE, then a bit in the current bit position in the minutes interval bit sequence can remain set to FALSE. Rollover events can occur in each higher order bit sequence in which the next lower order time interval expires and at least one bit is set in the bit sequence of that lower order time interval. This logic can capture longer periods of outages or healthy operation.

In some instances, one or more other monitored devices can be reporting watchdog messages according to a higher order time interval (e.g., minutes) in which a rollover event occurs. In this scenario, the current bit position of the higher order bit sequence can be set to TRUE if any of the other monitored devices received a watchdog message during the time period indicated by the current bit position (e.g., $1^{st}$ minute corresponding to bit 60), or if a bit was set to TRUE in the bit sequence of the prior time interval. Otherwise, the current bit position of the higher order bit sequence can remain set to FALSE. Setting the bit to true indicates a no failure state for the time period corresponding to that current bit position (e.g., $1^{st}$ minute of the current minutes interval). If the bit is FALSE, this indicates a failure state for the time period corresponding to that current bit position.

Reset rates 340 include a set of respective rates for resetting the bit sequences in device filter 300. Reset rates 340 correspond to the expiration of respective time intervals represented by device filter 300. Specifically, the reset rate of a bit sequence for a particular time interval is based on how often the particular time interval expires. In at least one embodiment, a reset rate for a bit sequence for a particular time interval indicates the rate at which the bit sequence is to be reset to all zeros (i.e., FALSE). For example, the bit sequence for seconds interval 302-1 is to be reset every minute, the bit sequence for minutes interval 302-2 is to be reset every hour, the bit sequence for hours interval 302-3 is to be reset every day, the bit sequence for days interval 302-4 is to be reset every week, and the bit sequence for weeks interval 302-5 is to be reset every year.

The reset rates can also trigger resetting a current bit position of the reporting time interval and resetting or updating a current bit position of one or more higher order bit sequences in device filter 300. The reset rate of the reporting time interval (every minute) indicates when the current bit position of the reporting time interval bit sequence is to be reset to the first bit position (bit 0) in the bit sequence. A current bit position of every higher order bit sequence is also reset to the first (beginning) bit position of that higher order bit sequence based on its own reset rate. When a reporting time interval expires, a rollover event occurs in one or more of the higher order bit sequences. When a rollover event occurs in a higher order bit sequence, if the time interval of that bit sequence has not expired, then the current bit position of that higher order bit sequence is incremented by one and identified as the next bit position in the bit sequence.

An example is now provided to further illustrate these concepts. In this example, seconds interval 302-1 is a reporting time interval of device filter 300. When the first seconds interval expires, a minute has passed. The reset rate for the seconds interval is every minute. Therefore, a rollover event occurs in the first bit (bit 60) of the bit sequence of minutes interval 302-2, and the current bit position of the bit sequence for seconds interval 302-1 is reset to the first bit position (bit 0) of the bit sequence. When the sixtieth seconds interval expires, one hour has passed and therefore, minutes interval 302-2 also expires. A rollover event occurs in the first bit (bit 120) of the bit sequence for the hours interval 302-3 and in the last bit (bit 119) of the bit sequence for minutes interval 302-2. Because the reset rate for minutes interval 302-2 is every hour, the current bit position of the bit sequence for minutes interval 302-2 is reset to the first bit position (bit 60) of that bit sequence. The current bit position of the bit sequence for seconds interval 302-1 is reset to the first bit position (bit 0) of that bit sequence. The current bit position of the bit sequence for hours interval 302-3 is incremented by one to be identified as the next bit in that bit sequence (bit 121). Also, the bits in the bit sequence for the seconds interval and the bits in the bit sequence for the minutes interval are reset to all zeros, or FALSE. Other bit sequences are not reset to zeros until their interval periods have expired.

Shadow filter 350 contains health reports of the monitored device associated with device filter 300. As previously mentioned herein, in some implementations, the same shadow filter can contain health reports of multiple nodes, whose health information is captured in the same device filter, for example. Generally, a health report of monitored device 304 describes the health of the monitored device by preserving the indications of failure from the device filter, where the device filter that captures this information based on whether watchdog messages are regularly received from the monitored device according to the watchdog schedule of the monitored device. A new health report can be started by initializing shadow filter 300 to an initialization value (e.g., all ones). If a failure state is indicated by zeros (FALSE) in device filter 300, then the indications of the failure state can be preserved in shadow filter 350 by performing the logical AND operation between bits in the device filter and bits in the shadow filter.

Shadow filter 350 can include enough bits to mirror device filter 300. In the example of FIG. 3, bit sequences of shadow filter 350 mirror the bit sequences of device filter 300. Shadow filter 350 includes a bit sequence of sixty bits (bits 0-59) for a seconds interval 352-1, a bit sequence of sixty bits (bits 60-119) for a minutes interval 352-2, a bit sequence of twenty-four bits (bits 120-143) for an hours interval 352-3, a bit sequence of seven bits (bits 144-150) for a days interval 352-4, and a bit sequence of fifty-two bits (bits 151-202) for a weeks interval 352-5.

Each time a reporting time interval expires, failures indicated in device filter 300 can be preserved in shadow filter 350 prior to resetting the bits in the device filter. In at least one embodiment, a logical AND operation can be performed on corresponding bit sequences of device filter 300 and shadow filter 350, based on the appropriate reset rate 340. For example, a logical AND operation can be performed every minute on the bit sequence of seconds interval 352-1 of shadow filter 350 and the bit sequence of seconds interval 302-1 of device filter 300. In at least some embodiments, a logical AND operation can be performed on other corresponding bit sequences based on their designated reset rates. In particular, a logical AND operation can be performed every hour on the bit sequence of minutes interval 352-2 of shadow filter 350 and a bit sequence of minutes interval 302-2 of device filter 300. A logical AND operation can be performed every day on the bit sequence of hours interval 352-3 of shadow filter 350 and the bit sequence of hours interval 302-3 of device filter 300. A logical AND operation can be performed every week on the bit sequence of days interval 352-4 of shadow filter 350 and the bit sequence of days interval 302-4 of device filter 300. A logical AND operation can be performed every year on the bit sequence of weeks interval 352-5 of shadow filter 350 and the bit sequence of weeks interval 302-5 of device filter 300.

In another embodiment, a logical AND operation is performed on fewer bits in device filter 300 and corresponding bits in shadow filter 350 to preserve the failures. The bits in the device filter to be used in the logical AND operation can include the bits in the bit sequence for the expired reporting time interval and each current bit in a higher order bit sequence that was set to one (TRUE) or left as zero (FALSE) based on the expiration of the reporting time interval or one of the higher order time intervals. Other bits in the device filter that may be used in the logical AND operation can include any bits in device filter 300 prior to the last current bit that was set to a one (TRUE) or left as a zero (FALSE) based on the expiration of the reporting time interval or one of the higher order time intervals. In this embodiment, failures that are indicated in the bit sequences representing the higher order time intervals are preserved upon the expiration of each reporting time interval, without waiting until the higher order time interval expires.

Embodiments described herein can also accommodate monitored devices that utilize a sleep mode during which time they do not deliver watchdog messages. Some nodes normally shut down to conserve power. The health filter can record sleep events so that absence of activity does not signal false positive responses. In at least one embodiment, sleep bit 203 may be used in device filter 300 to enable this feature. A monitored device can send a last watchdog message prior to entering a sleep mode. This last watchdog message can include a sleep bit that is set to TRUE (i.e., 1). The sleep bit from the watchdog message can be recorded in device filter 300 in sleep bit 203. Setting sleep bit 203 to TRUE indicates that no watchdog messages are expected. Updates to a device filter can be blocked for the monitored device until another watchdog message is received from the monitored device that clears sleep bit 203. In some embodiments, updates to the device filter are blocked by halting the processing related to monitoring watchdog messages from the monitored device until the sleep bit is cleared.

Figure 4:
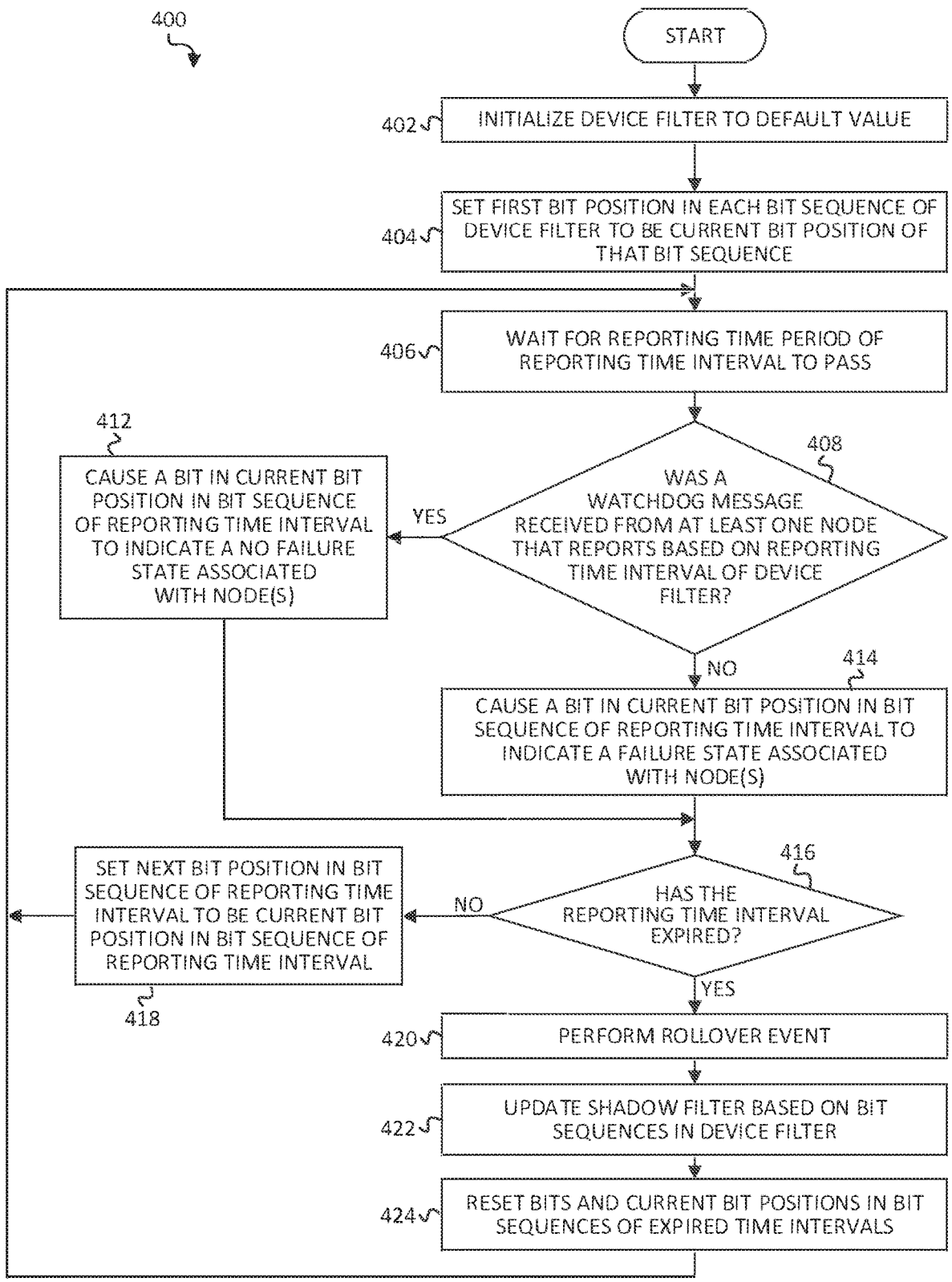
FIG. 4 is a simplified flowchart illustrating potential operations associated with an embodiment of the communication system for monitoring and analyzing a network.

FIG. 4 is a simplified flowchart illustrating a flow 400 of potential operations that may be associated with at least one embodiment described herein. In at least one embodiment, one or more sets of operations correspond to activities of FIG. 4. A network device (e.g., 40 or 40-1 through 40-N) may comprise means such as one or more processors (e.g., processor 47), for performing the operations. In one example, at least some operations shown in flowchart 400 may be performed by a monitor (e.g., 50), including device monitoring module 43, to monitor one or more nodes (e.g., monitored devices 30-1 through 30-M, network devices 40 and 40-1 through 40-N) and capture information in a device filter based on whether watchdog messages are received according to watchdog schedules of the nodes.

At 402, a device filter can be initialized to a default value. For ease of illustration, operations of FIG. 4 are described assuming that the device filter is configured in the same manner as device filter 300 of FIG. 3. It will be apparent, however, that the device filter may be implemented in any number of different ways depending on the relevant watchdog reporting schedules of the nodes used to populate the device filter. In one possible implementation, the default value for initializing a device filter is zero. Thus, each bit in each bit sequence of the device filter can be initialized to zero in this example. At 404, a first bit position in each bit sequence of the device filter is set to be the current bit position of that bit sequence (e.g., bits 0, 60, 120, 144, 151).

The device filter can have a plurality of bit sequences representing a plurality of time intervals (e.g., seconds, minutes, hours, days, weeks), respectively. One or more nodes may generate watchdog messages according to their respective watchdog schedules (e.g., every second, every minute, etc.). Their watchdog schedules may be the same or different. For example, three nodes may all report watchdog messages every minute. In another example, one node may report watchdog messages every second and two nodes may report watchdog messages every hour.

The time interval that is associated with the most frequent reporting of watchdog messages for a particular device filter is referred to herein as the reporting time interval for that device filter. For example, if at least one of the nodes reports every second and the other noses, if any, report less frequently (e.g., hourly, daily, weekly, etc.) then the seconds interval is the reporting time interval for that device filter. In another example, if at least one of the nodes reports every day and the other node, if any, report less frequently, (e.g., weekly), then the days interval is the reporting time interval for that device filter. Time intervals may be started based on a clock in the network device.

The reporting time interval can be started and at 406, the system can wait for the reporting time period (e.g., one second) of the reporting time interval (e.g., seconds interval) to pass. When a second passes, at 408, a determination is made as to whether a watchdog message was received from at least one node that reports watchdog messages based on the reporting time interval (e.g., every second). If no watchdog messages that meet the criteria were received, then at 414, the monitor can cause a bit in the current bit position in the bit sequence of the reporting time interval to indicate a failure state associated with the one or more nodes that are expected to report during the reporting time interval. If it is determined, at 408, that a watchdog message was received from at least one node that reports watchdog messages based on the reporting time interval, then at 412, the monitor can cause a bit in the current bit position in the bit sequence of the reporting time interval to indicate a no failure state associated with the one or more nodes that are expected to report during the reporting time interval.

Once a bit in the current position provides the appropriate indication for the one or more nodes, at 416, a determination is made as to whether the reporting time interval has expired. If the reporting time interval has not expired (e.g., 60 seconds have not passed), then at 418, the next bit position in the bit sequence of the reporting time interval is set to be the new current bit position for the reporting time interval. Flow then passes to 406, where the monitor can wait for the next reporting time period (e.g., 1 second) of the reporting time interval to pass and the flow can continue as previously described.

If the reporting time interval has expired, as determined at 416, then at 420, a rollover event can be performed in the bit sequence representing the next higher order time interval (e.g., minutes interval) in the device filter. At 422, a shadow filter can be updated based on bit sequences in the device filter that represent expired time intervals. Performing rollover events and updating a shadow filter will be more fully described in FIG. 5 and FIG. 6, respectively.

Once the rollover event has been performed and the shadow filter has been updated, at 424, the bits in bit sequences of expired time intervals can be reset. In at least one example, resetting a bit sequence of a device filter includes setting all bits to zero. In addition, the current bit positions in bit sequences of expired time intervals can also be reset to the first bit position of the bit sequence. For example, with reference to device filter 300, the current bit position in the bit sequence of the seconds interval can be reset to bit 0. Current bit positions in other bit sequences can be reset when their corresponding time intervals expire. Once the bits and current bit positions are reset in the device filter, the flow can return to 406, where the monitor can wait for the reporting time period (e.g., 1 second) of the reporting time interval to pass and the flow can continue as previously described.

It should be noted that the logic of flowchart 400 could also accommodate devices that may periodically or regularly enter a sleep mode. Each watchdog message can be examined to determine whether it provides an indication that its node is switching to a sleep mode. For example, an indication can be provided by a sleep bit in a watchdog message. The sleep bit can be set to TRUE to indicate the monitored device is switching to a sleep mode. If a single monitored device is reporting for a device filter, then a sleep bit (e.g., sleep bit 203) in the device filter can be set to indicate that no more watchdog messages are expected from that monitored device. In at least one embodiment, while the monitored device remains in the sleep mode, the node can process the device filter as if watchdog messages are being received according to the reporting schedule. Processing actual watchdog messages can begin again when a watchdog message is received from the monitored device and clears the sleep bit by resetting it to FALSE.

If multiple monitored devices are reporting for a single device filter, then the sleep bit may not be set until all of the monitored devices have switched to a sleep mode. In this case, the sleep bit in the device filter can be set after receiving a watchdog message from every device with a sleep bit set to TRUE. In at least one embodiment, while the monitored devices remain in the sleep mode, the node can process the device filter as if watchdog messages are being received according to the reporting schedules of the monitored devices. Processing actual watchdog messages can begin again when a watchdog message is received from a device that clears the sleep bit by resetting it to FALSE.

Figure 5:
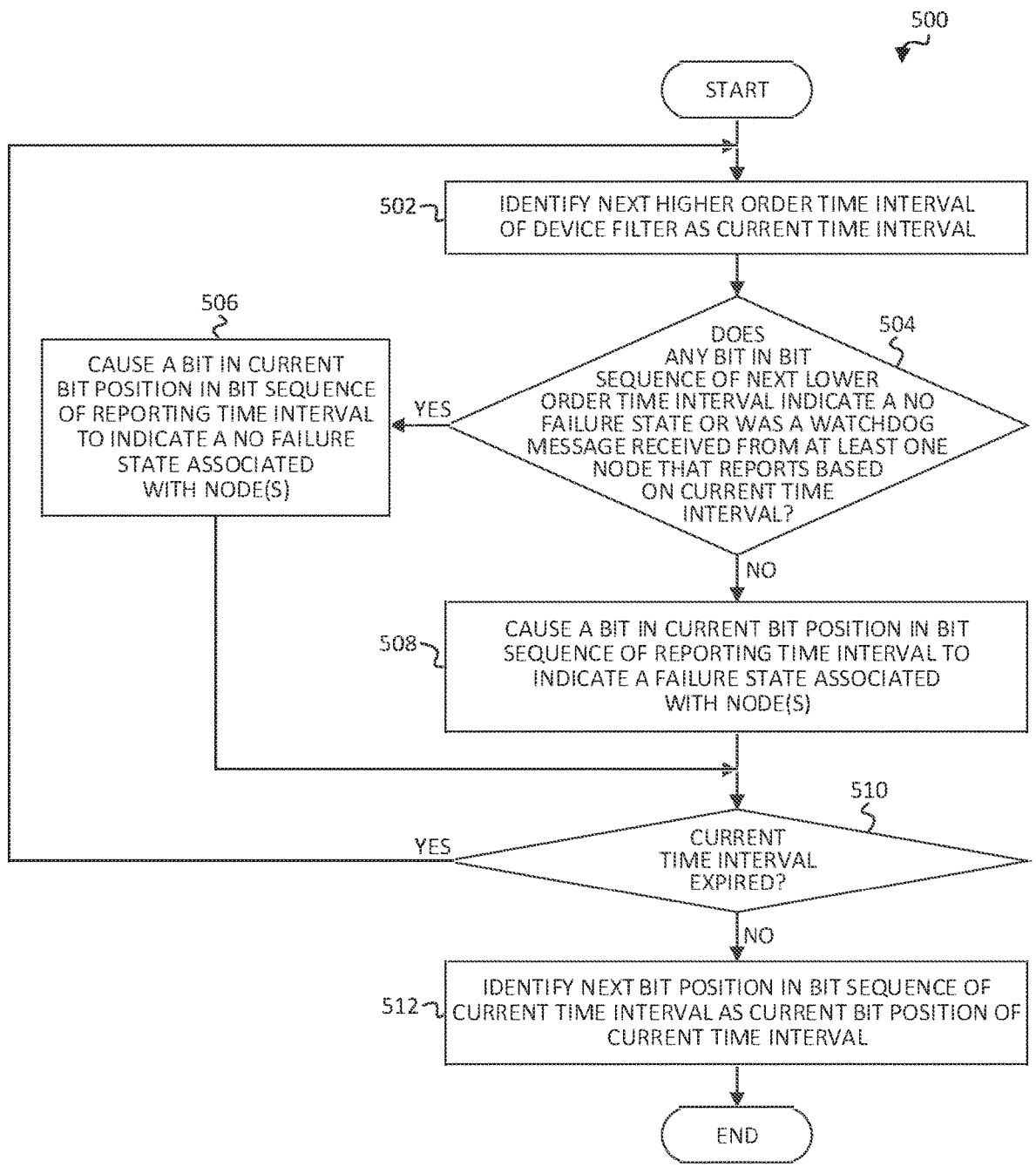
FIG. 5 is a simplified flowchart illustrating additional potential operations associated with an embodiment of the communication system for monitoring and analyzing a network.

FIG. 5 is a simplified flowchart illustrating a flow 500 of potential operations that may be associated with at least one embodiment described herein. In at least one embodiment, one or more sets of operations correspond to activities of FIG. 5. A network device (e.g., 40 or 40-1 through 40-N)

may comprise means such as one or more processors (e.g., processor 47), for performing the operations. In one example, at least some operations shown in flowchart 500 may be performed by a monitor (e.g., 50), including device monitoring module 43, to perform a rollover event when one or more time intervals associated with a device filter expire. For example, one or more operations depicted in flowchart 500 may occur to perform a rollover event indicated at 420 of FIG. 4.

In at least one embodiment, the operations of flowchart 500 may begin after a determination is made at 416 that the reporting time interval expired. At 502, a next higher order time interval associated with the device filter can be identified as the current time interval. For example, if the determination has been made that the reporting time interval (e.g., seconds interval) expired, then the minutes interval can be identified as the next higher order time interval or current time interval. At 504, a determination can be made as to whether any bit is set in the bit sequence of the next lower order time interval that has expired or whether a watchdog message was received from at least one node that reports based on the current time interval. Thus, if there are no nodes that report based on the current time interval, then the determination is simply whether any bit is set in the bit sequence of the next lower order time interval that has expired.

If a determination is made, at 504, that at least one bit in the bit sequence of the next lower order time interval indicates a no failure state (e.g., bit set to 1) or that a watchdog message was received from at least one node that reports based on the current time interval, then at 506, the monitor can cause a bit in the current bit position in the bit sequence of the current time interval to indicate a no failure state is associated with the nodes that are supposed to report during the current time interval and the nodes that report at lower order time intervals.

If a determination is made, at 504, that no bits in the next lower order time interval indicate a no failure state (i.e., all bits indicate a failure state) and that no watchdog messages were received from at least one node that reports based on the current time interval, then at 508, the monitor can cause a bit in the current bit position in the bit sequence of the current time interval to indicate a failure state associated with the nodes that are supposed to report during the current time interval and/or the nodes that report at lower order time intervals. The failure state indication or no failure state indication in a particular bit position is associated with the time period corresponding to the particular bit position.

Once a bit in the current position provides the appropriate indication for the nodes, at 510, a determination is made as to whether the current time interval has expired. If the current time interval has expired (e.g., 60 minutes have passed), then flow passes back to 502, where the next higher order time interval can be identified as the new current time interval. Flow can continue as previously described. If the current time interval has not expired, as determined at 510, then at 512, the current bit position of the bit sequence of the current time interval can be incremented by one to identify the next bit position as the new current bit position of the current time interval.

Figure 6:
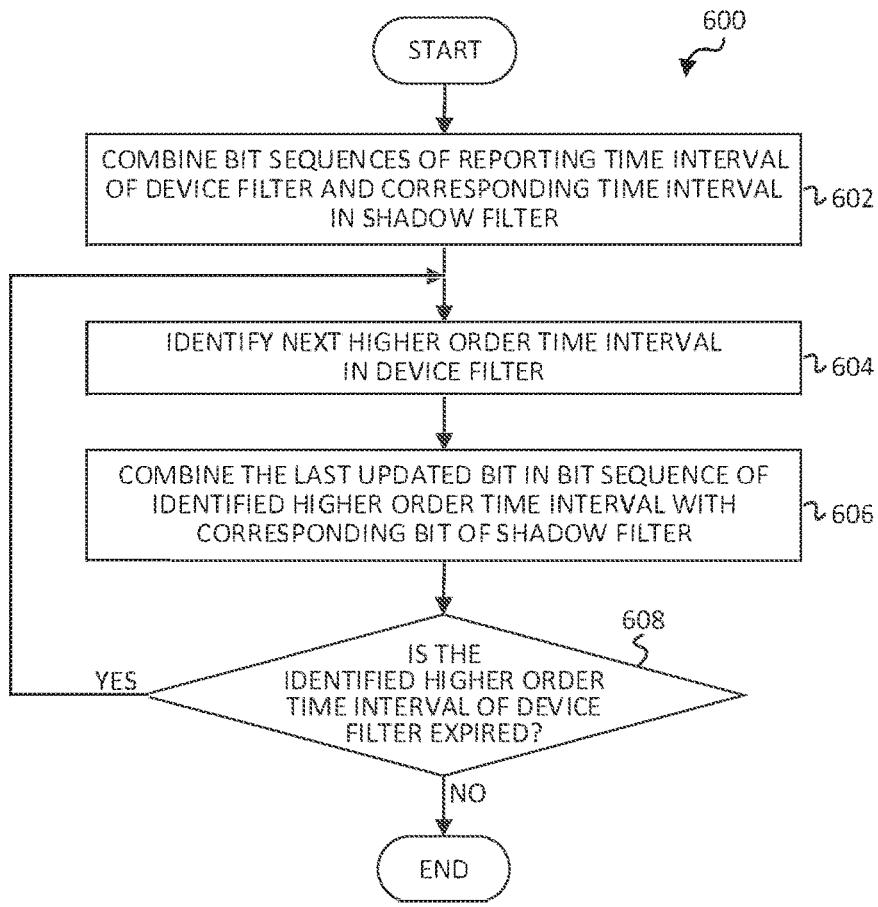
FIG. 6 is a simplified flowchart illustrating additional potential operations associated with an embodiment of the communication system for monitoring and analyzing a network.

FIG. 6 is a simplified flowchart illustrating a flow 600 of potential operations that may be associated with at least one embodiment described herein. In at least one embodiment, one or more sets of operations correspond to activities of FIG. 6. A network device (e.g., 40 or 40-1 through 40-N) may comprise means such as one or more processors (e.g., processor 47), for performing the operations. In one example, at least some operations shown in flowchart 600 may be performed by a monitor (e.g., 50), including device monitoring module 43, to perform a shadow filter update when one or more time intervals associated with a device filter expire. For example, one or more operations depicted in flowchart 600 may occur to update a shadow filter as indicated at 422 of FIG. 4.

At 602, the shadow filter is updated by combining a bit sequence of the reporting time interval in the device filter with a bit sequence of a corresponding time interval in the shadow filter. For example, if seconds interval 302-1 of device filter 300 is the reporting time interval, then the bit sequence of seconds time interval 302-1 of device filter 300 could be combined with seconds interval 352-1 of shadow filter 350.

At 604, the next higher order time interval in the device filter is identified. In this scenario, the next higher order time interval is minutes interval 302-2 in device filter 300. At 606, the shadow filter can be updated based on the bit sequence of the identified higher order time interval. In at least one implementation, the last bit that was updated in the bit sequence of the identified higher order time interval, and all prior bits in that bit sequence, can be combined with corresponding bits in the shadow filter. In another implementation, only the last bit that was updated in the bit sequence of the identified higher order time interval is combined with a corresponding bit in the shadow filter. This could be possible because the prior bits in the bit sequence would have already been combined with corresponding bits in the shadow filter during previous updates to the shadow filter. In instances where no bits in the bit sequence of the identified higher order time interval have been previously updated, then only the first bit in the bit sequence of the identified higher order time interval is to be combined with a corresponding bit in the device filter.

At 608, a determination is made as to whether the identified higher order time interval in the device filter is expired. If the last bit in the bit sequence of the identified higher order time interval is the last bit that was updated in that bit sequence, then the identified higher order time interval is expired. If it has not expired, then the update of the shadow filter is complete. However, if the identified higher order time interval has expired, then flow passes back to 604, where the next higher order time interval in the device filter is identified and processing continues as previously described.

It should be noted that the operations to combine the bits at 602 and 606 could be implemented using any type of logic operation that allows the failure state indications to be preserved in the shadow filter. In one example, the shadow filter is initialized to all 1s. If bits in the device filter are set to 0 to indicate a failure state and set to 1 to indicate a no failure state, then a logical AND operation can be applied to the appropriate bits in the device filter and the corresponding bits in the shadow filter. The resulting zeros in the shadow filter can preserve the failure state indications from the device filter. Although this is one possible implementation, other types of logic including, but not limited to logical OR operations and logical XOR (exclusive OR) operations, may be used with appropriate default values for the device filters and shadow filters to ensure that failure states indicated by bits in a device filter are preserved in a shadow filter when bits in the device filter are combined with bits in the shadow filter.

Figure 7:
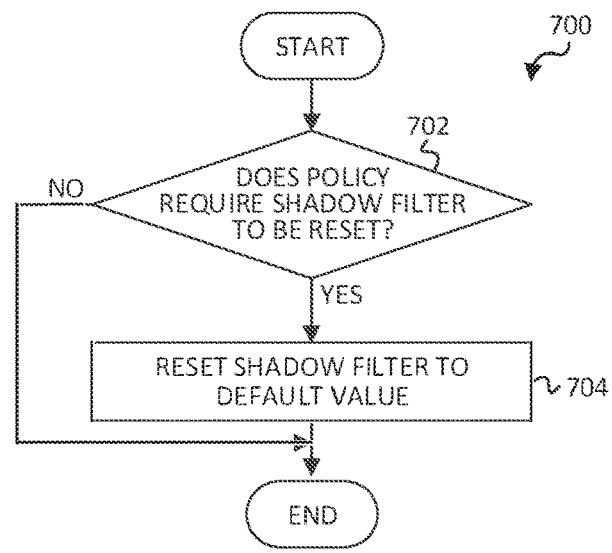
FIG. 7 is a simplified flowchart illustrating additional potential operations associated with an embodiment of the communication system for monitoring and analyzing a network.

FIG. 7 is a simplified flowchart illustrating a flow 700 of potential operations that may be associated with at least one embodiment described herein. In at least one embodiment, one or more sets of operations correspond to activities of FIG. 7. A network device (e.g., 40 or 40-1 through 40-N) may comprise means such as one or more processors (e.g., processor 47), for performing the operations. In one example, at least some operations shown in flowchart 700 may be performed by a monitor (e.g., 50), including device monitoring module 43, to reset the shadow filter. For example, one or more operations depicted in flowchart 700 may occur during an update to a shadow filter as indicated at 422 of FIG. 4, or may occur separately based on other triggering mechanisms.

At 702, a determination is made as to whether a policy requires the shadow filter to be reset. In at least one embodiment, a shadow filter reset policy can correlate to network device configuration (e.g., router configuration) that specifies how frequently messages are propagated, where the messages indicate nodes of a subnet are currently up. Thus, when such messages are propagated, the policy may require the shadow filter or filters for the subnet to be reset. Accordingly, if the policy requires the shadow filter to be reset, then at 704, the shadow filter can be reset to default values. In one example, each bit in the shadow filter is reset to a one (1) or TRUE. It should be apparent, however, that the logic for preserving failures in the shadow filter can be designed in any number of ways and the default value of the shadow filter may be different depending on the particular logic that is implemented. Once the shadow filter is reset at 704, or if the policy does not require a reset as determined at 702, the flow can end.

Figure 8:
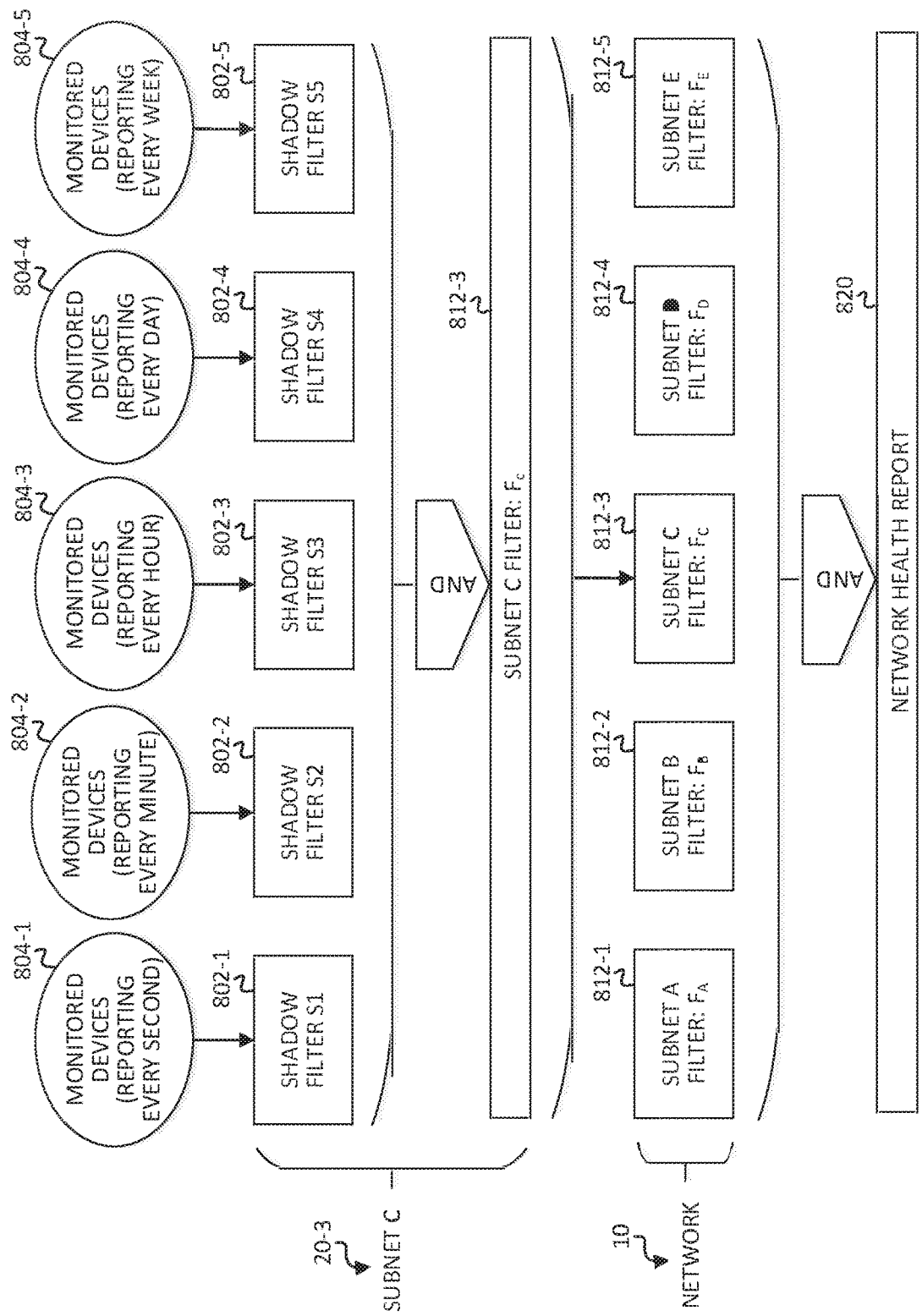
FIG. 8 is a simplified block diagram illustrating a process for creating an example network health report according to an embodiment.

Turning to FIG. 8, FIG. 8 is a block diagram illustrating a simplified process of creating an example network health report in a network. In this example, network 10 comprises sub-networks A, B, C, D and E. A health report 820 is also referred to herein as a 'network filter' and can be configured as a sparse array that essentially describes the health of network 10. In this example, health report 820 can be generated based on subnet A filter ($F_A$) 812-1, subnet B filter ($F_B$) 812-2, subnet C filter ($F_C$) 812-3, subnet D filter ($F_D$) 812-4, and subnet E filter ($F_E$) 812-5.

Subnet filters may also be configured as sparse arrays that essentially describe the health of their respective subnets. Subnet filters are also referred to herein as 'subnet health reports'. The shadow filters for nodes in a subnet may be combined into a subnet filter for the subnet. Thus, each subnet filter can be generated from one or more shadow filters. A subnet filter may sample the shadow filters multiple times before closing the subnet health report. Health monitoring policies may determine the sample interval. When the subnet health report is closed, the subnet health report can be provided to another network device to be combined into another report such as health report 820, and the subnet health report can be reset so that a new report can begin collecting health information for the subnet. Shadow filters are generated and updated based on respective device filters (e.g., device filter 300). The device filters are generated and updated from watchdog messages of nodes of subnets A through E.

FIG. 8 illustrates additional possible details of how subnet C filter ($F_C$) 812-3 of subnet C 20-3 could be generated. For example, subnet C filter 812-3 could be generated by being combined with shadow filter S1 802-1, shadow filter S2 802-2, shadow filter S3 803-3, shadow filter S4 802-4, and shadow filter S5 802-5. In at least one embodiment, the shadow filters that are consumed by a subnet filter can have the same configuration. For illustration purposes, the example in FIG. 8 assumes that shadow filters S1-S5 are configured in the same manner as shadow filter 350. Thus, the device filters (not shown in FIG. 8) corresponding to shadow filters S1-S5 can have the same configuration as device filter 300.

In the example of FIG. 8, each shadow filter S1-S5 is updated by a respective device filter that expects watchdog messages from nodes having a different reporting time period. For example, shadow filter S1 is updated by a device filter that has monitored devices 804-1 reporting every second. So shadow filter S1 can include information associated with monitored devices 804-1 in a bit sequence for a seconds interval and higher order time intervals when rollover events occur. Shadow filter S2 is updated by a device filter that has monitored devices 804-2 reporting every minute. So shadow filter S2 can include information associated with monitored devices 804-2 in a bit sequence for a minutes interval and higher order time intervals when rollover events occur. Shadow filter S3 is updated by a device filter that has monitored devices 804-3 reporting every hour. So shadow filter S3 can include information associated with monitored devices 804-3 in a bit sequence for an hours interval and higher order time intervals when rollover events occur. Shadow filter S4 is updated by a device filter that has monitored devices 804-4 reporting every day. So shadow filter S4 can include information associated with monitored devices 804-4 in a bit sequence for a days interval and the higher order time interval when rollover events occur. Shadow filter S5 is updated by a device filter that has monitored devices 804-5 reporting every week. So shadow filter S5 can include information associated with monitored devices 804-5 in a bit sequence for a weeks interval. There is no higher order time interval in this example. If lower order bit sequences of any of the shadow filters do not contain information from any reporting nodes, then those lower order bit sequences can contain ones, based on each of the shadow filters being initialized to ones.

Subnet C filter 812-3 maintains bit positions for each subnet node. In one embodiment, subnet C filter 812-3 has the same configuration as the shadow filters. In this embodiment, each shadow filter of shadow filters S1-S5 can be combined with subnet C filter 812-3 by performing operations that fold the shadow filters into the subnet C filter. In at least one embodiment, a logical AND operation can be performed using each shadow filter and the subnet filter. This allows failure information that is represented by zeros in the shadow filters to be propagated to (and retained in) the subnet filter. In some implementations, the multiple shadow filters can be folded into a single shadow filter and the single shadow filter can be combined with subnet C filter.

It should be apparent that, in some circumstances in this implementation, a bit that indicates no failure in a first shadow filter may be overwritten by a corresponding bit that indicates a failure in a second shadow filter. If the one bit in the first shadow filter is combined with a corresponding bit in the subnet C filter, then the corresponding bit in the subnet filter will continue to indicate no failure (e.g., set to 1). Once the bit in the second shadow filter is combined with the corresponding bit in the subnet filter, however, the corresponding bit in the subnet filter will indicate failure (e.g., set to 0). This can be tolerated, however, because the resulting subnet filter provides the information that failure occurred in the subnet, even though in this implementation the identity of the particular device associated with the error may be unknown. However, the reporting time period of the error in the subnet is recorded in the subnet filter (e.g., $3^{rd}$ second of a minute, $4^{th}$ hour of a day, etc.) in the subnet.

In another implementation, a subnet filter can maintain separate bit positions for each shadow filter. For example, subnet C filter 812-3 could be configured as a sparse array that is five times the size of one of the shadow filters S1-S5. Each shadow filter can be combined with a respective portion of the subnet C filter. In some implementations, the multiple shadow filters can be combined in a single shadow filter with separate bit positions for each shadow filter and the single shadow filter can be combined with subnet C filter.

Certain techniques may be used to increase efficiency and/or save bit space. For example, although a subnet filter maintains bit positions for the watchdog reporting of each subnet node, the subnet filter may be compressed using a method in which runs of four (4) or more of the same value may be counted and the count value is stored rather than the bit value. This type of compression can lower the health reporting load on the network. When a compression technique is used, application of AND logic is applied to bit values and not directly to count values.

The process for generating a network health report is similar to the process of generating a subnet health report. Generating a network health report can include merging subnet health reports into a network filter for the network. In at least one embodiment, the network filter can be a sparse array with the same configuration as subnet filters 812-1 through 812-5. In this embodiment, each subnet filter of subnet filters 812-1 through 812-5 can be combined with network filter by performing operations that fold the subnet filters into the network filter. In at least one embodiment, a logical AND operation can be performed using each subnet filter and the network filter. This allows failure information that is represented by zeros in the subnet filters to be propagated to (and retained in) the network filter. In some implementations, the multiple subnet filters can be folded into a single subnet filter and the single subnet filter can be combined with the network filter.

In another implementation, a network filter can maintain separate bit positions for each subnet filter. For example, network filter 820 could be configured as a sparse array that is five times the size of on one of the subnet filters 812-1 through 812-5. Each subnet filter can be combined with a respective portion of the network filter. In some implementations, the multiple subnet filters can be combined in a single subnet filter with separate bit positions for each subnet filter and the single subnet filter can be combined with network filter 820.

In at least one embodiment, communication system 100 uses network devices, such as network device 40 and 40-1 through 40-N, to establish one or more policies for how frequently to monitor and refresh shadow filters, subnet filters and network filters. In at least one implementation, the network devices can be routers capable of establishing and maintaining health monitoring policies. Shadow filters updated by a network device can retain multiple indications of failures (e.g., when watchdog messages are not received) during a window of time defined by the network device. A network health monitoring policy embedded within the network device fabric can track failures of subnets it services and can propagate subnet filters to other network devices (e.g., network devices in the next hierarchical level) according to the network device's method for reporting network failures. For example, a network device that supports routing information protocol (RIP) can propagate a message indicating that its associated subnet is failing based on a threshold of failure states indicated in its subnet filter. In another example, a network device that supports border gateway protocol (BGP) can propagate a message indicating that its associated subnet is functioning properly based on a threshold of no failure states indicated in its subnet filter. A shadow filter reset policy can correlate to the network device's configuration that specifies how frequently these BGP messages that indicate proper functioning are propagated.

Existing IoT framework security can be leveraged in communication system 100 to protect watchdog messages. In at least one embodiment, a trusted execution environment (TEE) may be provided in network devices, such as network device 40 and 40-1 through 40-N, to securely store and manage keys, and to enable attestation and cryptographic operations. Device filters and shadow filters may be attested using one or more attestation keys that sign the device filter in response to an attestation request and/or that sign a watchdog message before it is broadcast to a monitoring entity. The watchdog message generation logic can remain protected within a trusted execution environment, which provides greater assurance and resistance to being impacted by node failures.

In a scenario where a node failure is malicious (e.g., malicious software, malicious power outage, etc.), the failure event is not necessarily distinguishable from anomalies or unexpected behavior. Accordingly, a trusted execution environment can improve security of the node. An example technology that may be used to support a trusted execution environment includes, but is not limited to, Intel® Software Guard Extensions (SGX) by Intel Corporation. Enhanced security offered by a trusted execution environment can improve the probability that an attacker will be unable to prevent the release of the watchdog help message (e.g., SOS message). It can also improve the probability that an attacker will be unable to cover up an audit trail of evidence that may have been collected during the normal course of a security audit.

Figure 9A:
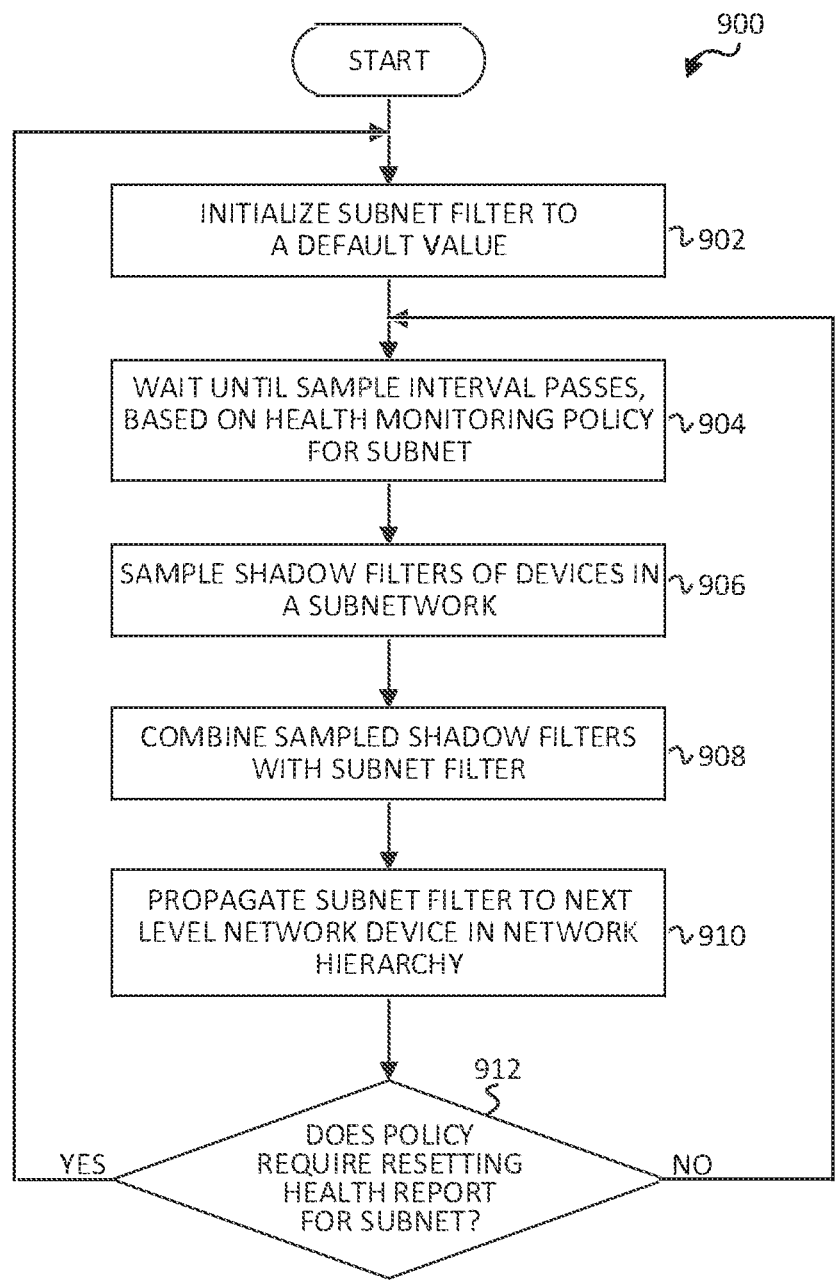
FIGS. 9A and 9B are simplified flowcharts illustrating additional potential operations associated with an embodiment of the communication system for monitoring and analyzing a network.

FIG. 9A is a simplified flowchart illustrating a flow 900 of potential operations that may be associated with at least one embodiment described herein. In at least one embodiment, one or more sets of operations correspond to activities of FIG. 9A. A network device (e.g., 40 or 40-1 through 40-N) may comprise means such as one or more processors (e.g., processor 47), for performing the operations. In one example, at least some operations shown in flow 900 may be performed by a monitor (e.g., 50), including network monitoring module 43, to monitor a subnet and capture information in a subnet filter based on shadow filters containing failure information from nodes in the subnet.

At 902, a subnet filter can be initialized to a default value. In at least one embodiment, subnet filters are initialized to all ones. At 904, the processing of flow 900 could be configured to wait until a sample interval for collecting shadow filters of the network device passes. The sample interval for collecting shadow filters can be based on a health monitoring policy for the subnet. The policy may be established by the network device, which generates the subnet filter, in conjunction with other network devices in the network.

At 906, the one or more shadow filters for the subnet associated with the network device can be sampled. For example, shadow filters S1-S5 of subnet C could be sampled by network device 40-3. At 908, each sampled shadow filter can be combined into the subnet filter. In at least one embodiment, the shadow filters can be combined with the subnet filter by performing a logical AND operation on each shadow filter and the subnet filter until all shadow filters are consumed by the subnet filter. These operations preserve, in the subnet filter, all of the failures indicated in the shadow filters (e.g., zeros)

At 910, the subnet filter can be propagated to the next level of network devices in the network. For example, network device 40-3 can propagate its subnet filter (e.g., 812-3) to network device 40. This is one possible example of the network topology that may be used in embodiments described herein. It should be noted, however, that any number of additional levels of subnets may be provided in communication system 100. Moreover, a hierarchical arrangement may not even be used in at least some embodiments.

At 912, a health monitoring policy may be evaluated to determine whether it requires the health report for the subnet to be reset. If the policy does require resetting the subnet filter, then flow can pass back to 902, where the subnet filter is initialized again, for example, to all ones. If the policy does not require the subnet filter to be reset, then flow may pass to 904, where the subnet filter is not re-initialized. Instead, the subnet filter continues to sample the shadow filters and add to its subnet health report in its subnet filter.

Figure 9B:
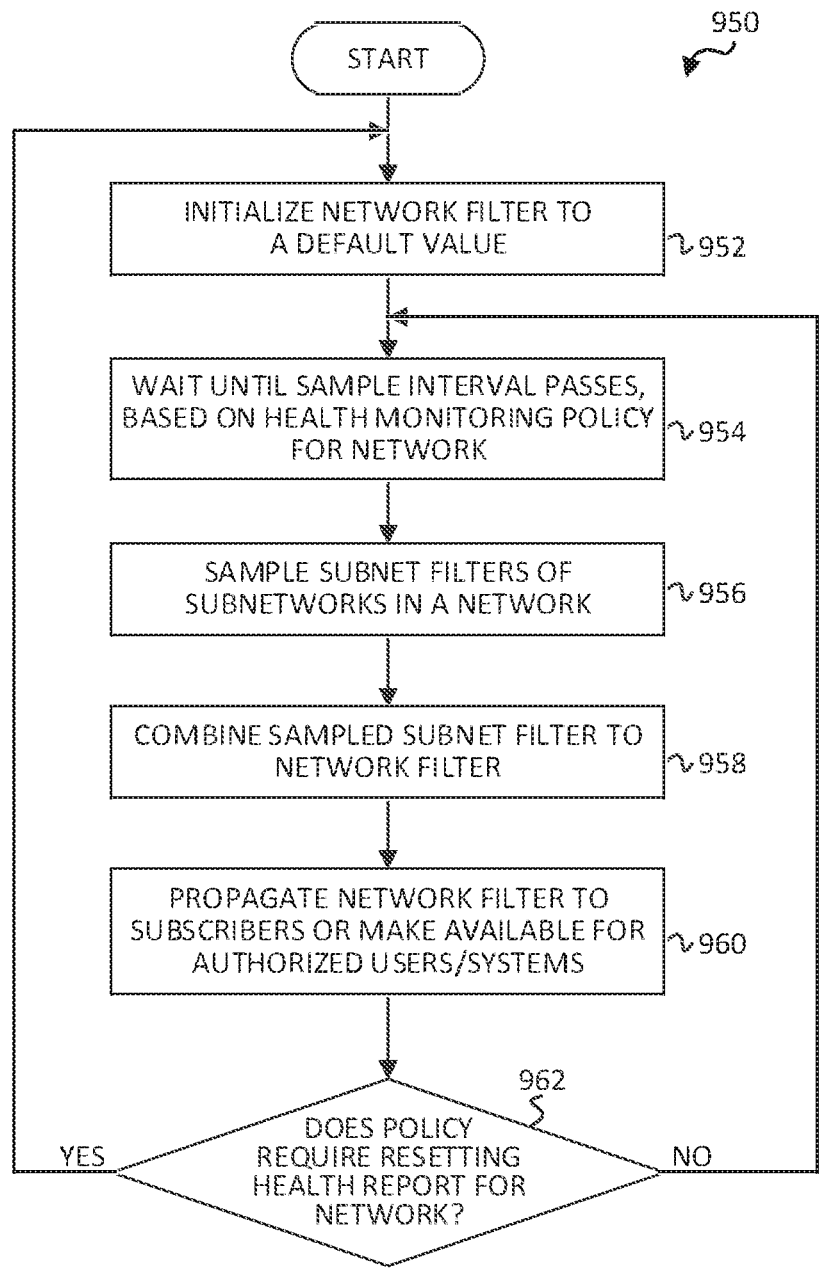

FIG. 9B is a simplified flowchart illustrating a flow 950 of potential operations that may be associated with at least one embodiment described herein. In at least one embodiment, one or more sets of operations correspond to activities of FIG. 9B. A network device (e.g., 40 or 40-1 through 40-N) may comprise means such as one or more processors (e.g., processor 47), for performing the operations. In one example, at least some operations shown in flow 950 may be performed by a monitor (e.g., 50), including network monitoring module 43, to monitor a network of subnets and capture information in a network filter based on subnet filters containing failure information from shadow filters associated with the subnets.

At 952, a network filter can be initialized to a default value. In at least one embodiment, a network filter is initialized to all ones. At 954, the processing of flow 950 could be configured to wait until a sample interval for collecting subnet filters of the network devices passes. The sample interval for collecting subnet filters can be based on a health monitoring policy for the network. The policy may be established by the network device, which generates the network filter, in conjunction with other network devices in the network.

At 956, the one or more subnet filters for the subnets associated with the network device can be sampled. For example, subnet filters A-E of network 10 could be sampled by network device 40. At 958, each sampled subnet filter can be combined into the network filter. In at least one embodiment, the subnet filters can be combined with the network filter by performing a logical AND operation on each subnet filter and the network filter until all subnet filters are consumed by the network filter. These operations preserve, in the network filter, all of the failure states indicated in all of the subnet filters (e.g., zeros). At 960, the network filter can be propagated to subscribers (e.g., network administrators, etc.) or can be made available to authorized users and/or systems.

At 962, a health monitoring policy may be evaluated to determine whether it requires the health report for the network filter to be reset. If the policy does require resetting the network filter, then flow can pass back to 952, where the network filter is initialized again, for example, to all ones. If the policy does not require the network filter to be reset, then flow may pass to 954, where the network filter is not re-initialized. Instead, the network filter continues to sample the subnet filters and add to the network health report in its network filter.

Figure 10:
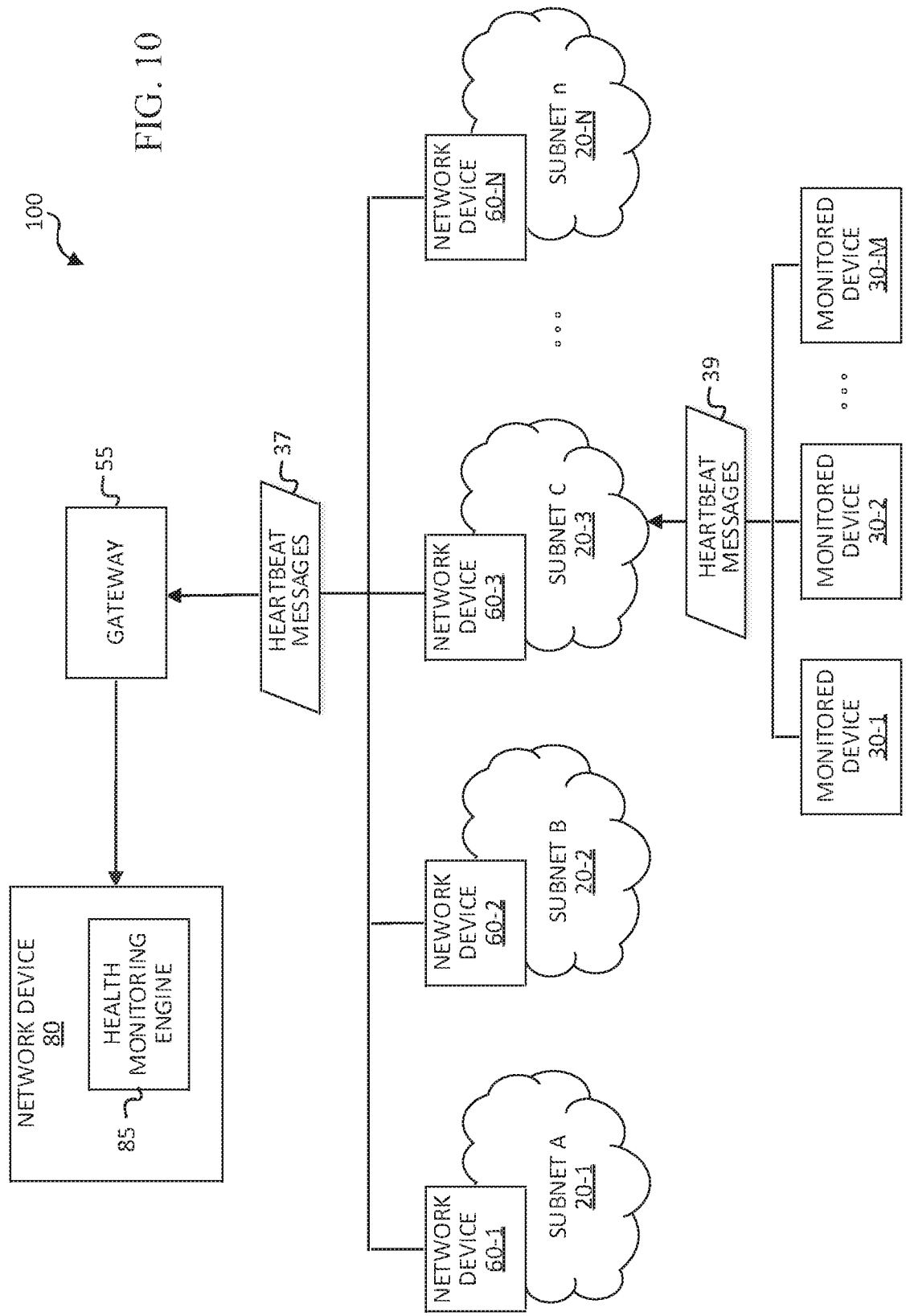
FIG. 10 is a simplified block diagram showing possible details of another embodiment of the communication system for monitoring and analyzing a network according to the present disclosure.

FIG. 10 is another simplified block diagram of communication system 100, with additional components for analyzing watchdog messages to enable detection of intermittent nodes (e.g., poor connectivity, hardware failures, software failures, etc.) in an Internet of Things (IoT) network environment. In FIG. 10, subnets 20-1 through 20-N include nodes, such as network devices 60-1 through 60-N, respectively. In at least one embodiment, network devices 60-1 through 60-N may be the same as network devices 40-1 through 40-N with monitors 50-1 through 50-N, respectively, for monitoring watchdog messages of monitored devices in subnets 20-1 through 20-N as previously described herein. In other embodiments, however, network devices 60-1 through 60-N may operate separately and/or independently from monitors of network devices 40-1 through 40-N. In at least one embodiment, network devices 60-1 through 60-N may be configured as routers for receiving and forwarding heartbeat messages 39 from nodes in the subnets toward a gateway 55 (or other suitable network device) in communication system 100. Heartbeat messages 37 can include heartbeat messages 39 from nodes in the subnets in addition to heartbeat messages from network devices 60-1 through 60-N, which are monitoring the nodes in the subnets. Gateway 55 can receive heartbeat messages 37 and provide the messages to health monitoring engine 85. Health monitoring engine 85 may be provisioned in a network device 80. In other implementations, health monitoring engine 85 may be co-located on gateway 55 or provisioned in any other suitable network device in communication system 100.

Health monitoring engine collects heartbeat messages 39 produced by nodes such as monitored devices (e.g., 30-1 through 30-M), routers (e.g., 60-1 through 60-N), hubs, concentrators, gateways (e.g., 55), and any other device, element or object that can produce watchdog messages in an IoT network environment. The health of the network can be evaluated using machine learning as a method for determining when various nodes and subnets are approaching a threshold at which resilience of the nodes and networks may be compromised.

Figure 11:
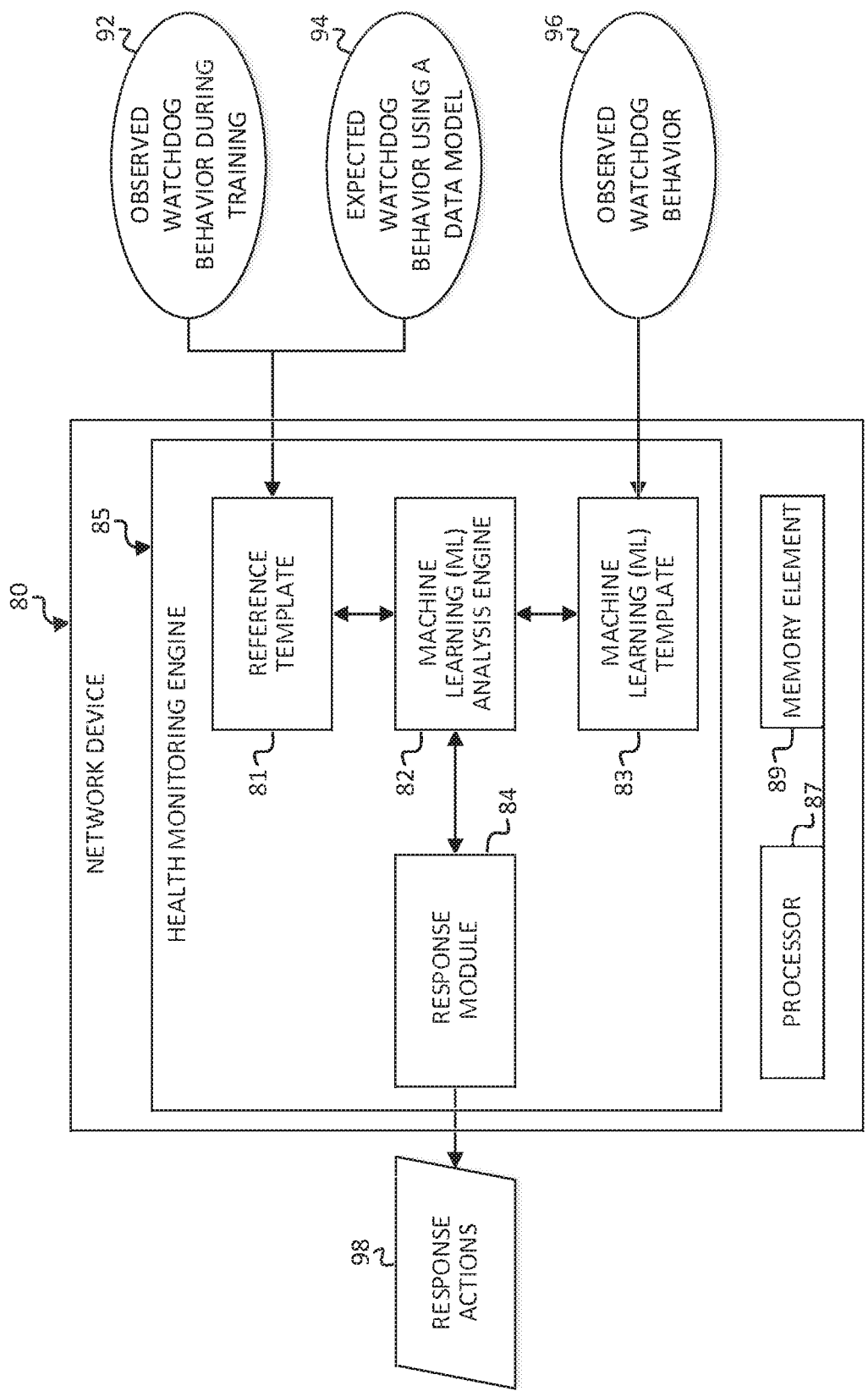
FIG. 11 is a simplified block diagram illustrating additional possible details of the embodiment of the communication system of FIG. 10.

FIG. 11 provides additional possible details of health monitoring engine 85 in at least one embodiment. Health monitoring engine (HME) 85 may be provisioned in network device 80, which includes at least one processor 87 and at least one memory element 89. HME 85 can include a reference template 81, a machine learning (ML) analysis engine 82, a machine learning (ML) template 83, and a response module 84. Reference template 81 can be constructed during a training period using a data model description of expected behavior 94 of a watchdog message traffic system, in addition to monitoring actual observed watchdog behavior 92 (i.e., heartbeat message traffic) during training. Reference template 81 can be used during normal operation where HME 85 evaluates variances and thresholds that may trigger a pro-active response and prescriptive response to improve network resilience properties prior to node or network failures. For example, ML analysis engine 82 can compute a threshold matching function that corrects for hysteresis and then dispatch a resiliency response action 98 via response module 84. Resiliency response actions may include, but are not limited to, notifications, repairs, and deployment of network redundancy in the form of redundant nodes, routers, routes and other network infrastructure.

Observed watchdog behavior 96 and observed watchdog behavior during training 92 can include heartbeat messages 37. A heartbeat message is a type of watchdog message that identifies additional information related to the node that produces the heartbeat message. In at least one embodiment, a heartbeat message can include one or more of a device identifier (ID), a local time stamp, a next heartbeat message time (e.g., infinite if the node is going into sleep mode), node health and diagnostic information (e.g., temperature, resource utilization, power utilization/battery life/use, flash burn rate, bus contention, network interface card (NIC) utilization, buffer utilization, dropped packets, etc.), and a watchdog report (e.g., subnet filter 812-3, network health report 820, etc.) from a subordinate (subnet) node or network of nodes.

Processing heartbeat messages 37 according to the present disclosure can involve several operations. In at least one embodiment, HME 85 can monitor the network while ML analysis engine 82 collects reference template 81 based on heartbeat messages that each node is configured to report. Reference template 81 can learn expected heartbeat patterns for the nodes that report heartbeat messages. ML analysis engine 82 can measure differences between the actual characteristics of heartbeat messages from a node and the expected properties of the heartbeat messages that are provided in the data model description. These characteristics can include, but are not limited to, heartbeat message arrival times, latencies and anomalies due to work patterns, times of day, site specific patterns, etc.

HME 80 can estimate the next heartbeat message of a particular node by appropriately combining the current clock time of HME 85, the node's clock at the time when the heartbeat message was sent, and the planned/configured heartbeat interval. The node's clock at the time when the heartbeat message was sent and the planned/configured heartbeat interval can both be included in the heartbeat message itself in at least one embodiment. The difference between the expected and actual receipt of the heartbeat message can also be included as part of the reference template construction.

HME 85 can switch to an operational mode when reference template 81 is complete. However, reference template can be regenerated or updated at scheduled intervals and/or as needed. Reference template 81 can be used as a baseline for detecting anomalies when the network is live, as it can indicate the pattern of heartbeat messages that should be reported. When the HME is in the operational mode, observed watchdog behavior 96 (e.g., received heartbeat messages) can be fed into ML template 83, which acts as a live system template of actual watchdog behavior. ML analysis engine 82 can perform differential analysis between ML template 83 and reference template 81. The differential analysis can reveal a statistical probability that watchdog behavior (i.e., received and/or missing heartbeat messages) is not consistent with normal operation of the node or network.

HME 85 can determine a threshold of missing heartbeats that constitutes a resiliency risk. The statistical probability can be compared to the threshold to determine whether a resiliency risk exists in the network. For example, in at least one embodiment, a threshold could be a 50% resilience risk. Thus, if the threshold is reached or exceeded (e.g., observed watchdog behavior is determined to have a 60% statistical probability that it is not consistent with normal operation of the node), then, in at least one embodiment, the HME may continue monitoring for a short period to avoid hysteresis. For example, this could be an additional monitoring period of a few seconds or minutes. If subsequent heartbeat messages do not arrive within the expected time (e.g., according to reference template 81), the resilience threshold may be acted upon.

Various resilience response actions may be taken when a determination is made to that a resiliency risk exists in a network for a particular node. One action involves increasing the sample rate resolution of the node to get a more accurate reading. For example, assume a normal CPU load reading of a particular device at four time intervals is 50%, 75%, 75%, and 50%. According to reference template 81, this pattern of CPU load is expected for the device. If the CPU load is observed as 50%, 75%, no message, and 50% during a subsequent observation, then there is a 25% probability of an anomaly because 3 out of 4 readings matched the expected CPU load readings. The device can be reconfigured to get twice as many reports, which may provide insight into what is happening to the CPU load between the second and fourth readings. For example, if the CPU load is observed at 50%, 75%, 95%, 100%, 100%, 95%, 75%, 50% during a another time period, then information can be gleaned from the additional reports that the CPU load gets too high (100%) between the third and fourth readings, which causes the heartbeat messages to fail. If the threshold for a normally functioning device is having a CPU load of not more than 75%, then another resiliency response action may be taken in response to the new information.

Other resiliency response actions may include, but are not limited to, notifications, repairs (e.g., a software or firmware patch or update), deployment of network redundancy in the form of, for example, redundant nodes, routers, routes, and other network infrastructure, physical replacement of the device (e.g., dispatch a human, drone, or autonomous vehicle to physically replace the device), or device reset. In one example, a notification includes generating an alert naming the node or subnet exhibiting abnormal watchdog behavior. Another type of notification includes marking a node such as a monitored device or subnet network device (e.g., router) as LOST.

In at least some scenarios, dispatching a redundancy construction process can be a preventative measure applied before actual failure occurs. Redundancy construction may include, but is not limited to, deployment of redundant nodes. For example, a second or third location beacon device may be deployed to augment a first or second location beacon device. In another example, a second router or other network infrastructure component may be deployed, including formation of additional network routes that bypasses single points of failure and choke points in the network topology.

Deployment of redundancy may result in additional producers of heartbeat messages. For example, second and third location beacon devices that are added to a network can result in the production of three heartbeat messages where there was originally a single message. This may result in heartbeat traffic patterns that skew the reference template of the HME. A technique employed by heartbeat message processors to avoid this skew can combine the heartbeat messages based on an understanding that all three devices are performing the same function (i.e., beaconing the same location). Hence, the heartbeat accounting logic can report PRESENT for the beacon function if any of the three heartbeat messages are received. Consequently, the receipt of a heartbeat message may become more accurate relative to the expected receipt of messages in the reference template. In at least one embodiment, this technique may be implemented on the HME. In other embodiments, this technique may be implemented in a dedicated HME for the redundant device sub-system.

Figure 12:
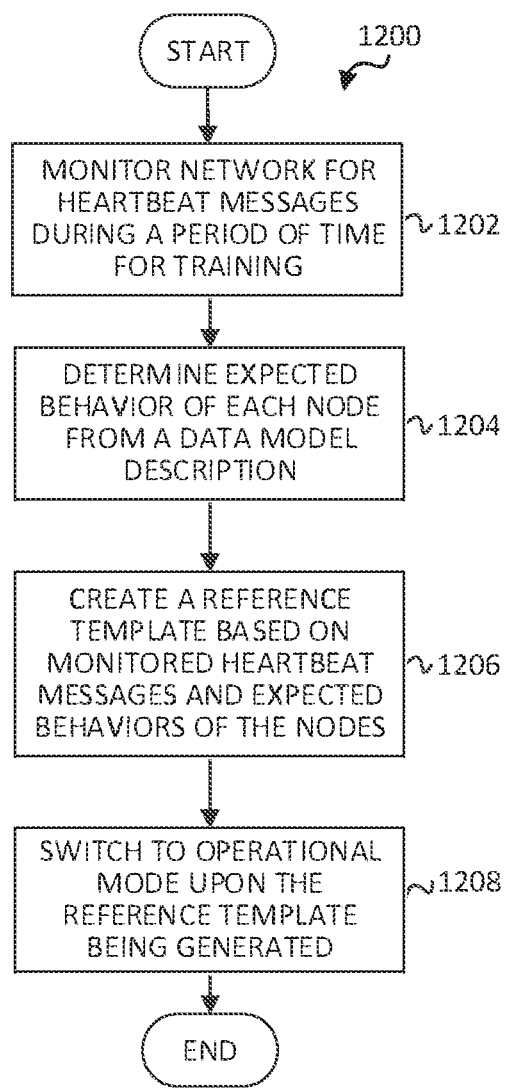
FIG. 12 is a simplified flowchart illustrating potential operations associated with an embodiment of the communication system for monitoring and analyzing a network.

FIG. 12 is a simplified flowchart illustrating a flow 1200 of potential operations that may be associated with at least one embodiment described herein. In at least one embodiment, one or more sets of operations correspond to activities of FIG. 12. A network device (e.g., 80) may comprise means such as one or more processors (e.g., processor 87), for performing the operations. In one example, at least some operations shown in flow 1200 may be performed by a health monitoring engine (e.g., HME 85), to construct a reference template (e.g., reference template 81) by using a data model description of an expected behavior of a watchdog message traffic system and by monitoring actual heartbeat messages.

At 1202, an HME can monitor a network for heartbeat messages over a period of time for training. At 1204, expected behavior of each node being monitored is determined from a data model description. The data model description can include, for example, particular characteristics of the nodes that are expected. For example, information related to the frequency at which heartbeat messages are expected to arrive may be included in the data model description. Other characteristics can include, but are not limited to, latencies and anomalies due to work patterns, times of day, site specific patterns, etc. Information included in the heartbeat messages themselves can be used to evaluate the expected characteristics in the data model description with actual characteristics of heartbeat messages received during the training period while the reference template is being created. At 1206, a reference template is created based on the heartbeat messages observed during the training period and the expected watchdog behavior determined from the data model description. At 1208, upon the reference template being generated, the health monitoring engine can switch to an operational mode, in which heartbeat messages are monitored and compared with the reference template to identify anomalies.

Figure 13:
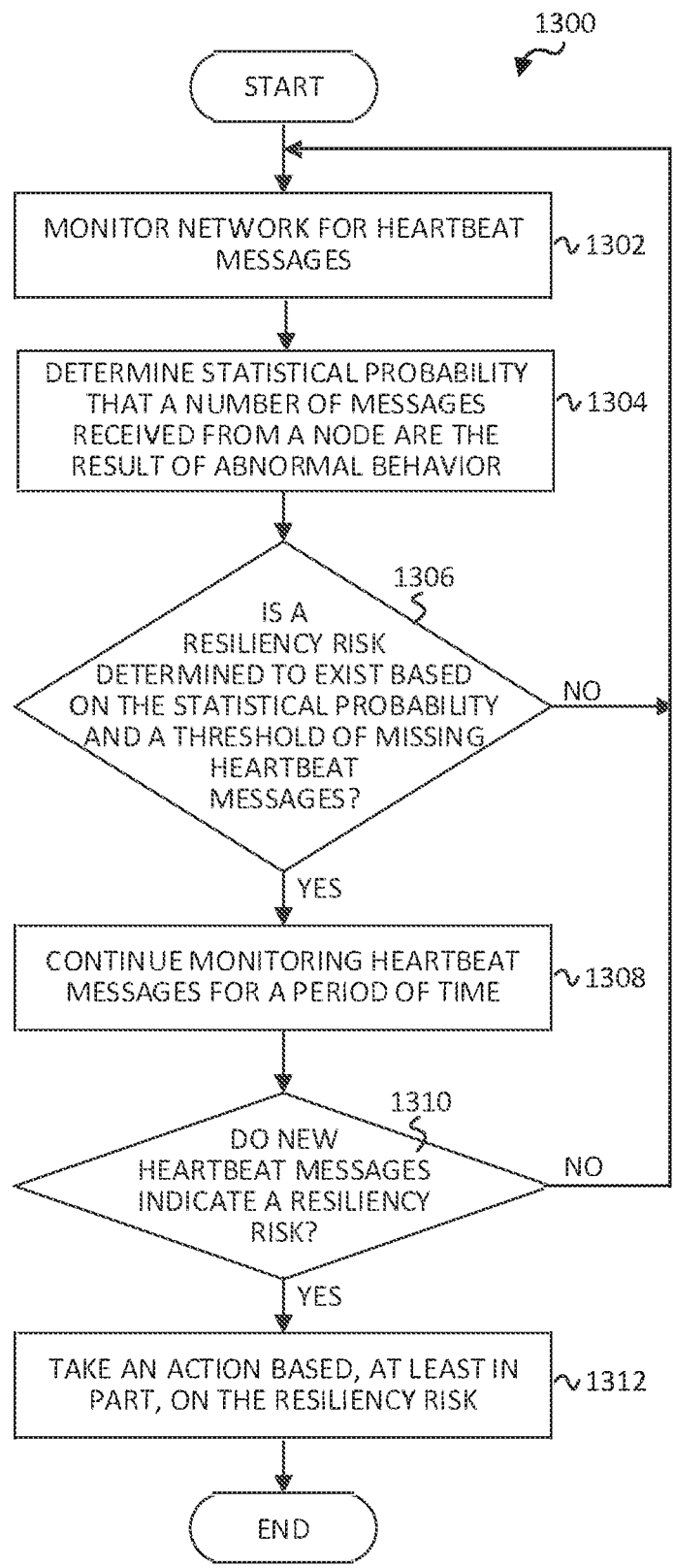
FIG. 13 is a simplified flowchart illustrating additional potential operations associated with an embodiment of the communication system for monitoring and analyzing a network.

FIG. 13 is a simplified flowchart illustrating a flow 1300 of potential operations that may be associated with at least one embodiment described herein. In at least one embodiment, one or more sets of operations correspond to activities of FIG. 13. A network device (e.g., 80) may comprise means such as one or more processors (e.g., processor 87), for performing the operations. In one example, at least some operations shown in flow 1300 may be performed by a health monitoring engine (e.g., HME 85), to monitor heartbeat messages, compute a threshold matching function, and dispatch a resiliency response action, if appropriate, based on the results of the threshold matching function.

At 1302, a network is monitored for heartbeat messages over a period of time or monitoring period. At 1304, a statistical probability that a number of heartbeat messages received from a node are the result of abnormal behavior is determined. This determination can be made based on a comparison of a reference template and a machine learning template that contains data from the observed heartbeat messages. In some instances the reference template can indicate only an amount and frequency of heartbeat messages that should be received for a particular node. In other instances, the reference template can indicate certain information related to a node that should be reported in the heartbeat messages (e.g., temperature, resource utilization, power utilization/battery life/use, flash burn rate, bus contention, network interface card (NIC) utilization, buffer utilization, dropped packets, health reports, etc.)

At 1306, a determination is made as to whether the heartbeat messages indicate a resiliency risk. In one example, a heartbeat message is considered a failure or missing if it is not received at an expected time according to the reference template. In another example, a heartbeat message is considered a failure or missing if the heartbeat message does contain expected information related to the node (e.g., CPU utilization, etc.). The determination of whether a number of heartbeat messages received during a monitoring period indicate a resiliency risk may be based, at least in part, on the determined statistical probability that the number of received heartbeat messages is the result of abnormal behavior and a threshold of missing heartbeat messages that constitutes a resiliency risk. If a determination is made that the heartbeat messages do not indicate a risk, then flow can return to 1302, where the HME can continue to monitor heartbeat messages.

If a determination is made that the heartbeat messages indicate a risk, then at 1308, the HME may continue monitoring the heartbeat messages for an additional period of time to avoid hysteresis. Once the additional monitoring period has expired, the newly received heartbeat messages may be evaluated to determine if they indicate a resiliency risk. At 1310, a determination is made as to whether the newly observed heartbeat messages indicate a resiliency risk (e.g., if the newly received heartbeat messages did not arrive within an expected time according to the reference template). If the determination is made that the new heartbeat messages do not indicate a resiliency risk, then flow can return to 1302, where the HME continues to monitor heartbeat messages. If the determination is made that the new heartbeat messages do indicate a resiliency risk, however, then at 1312, a response action may be taken based, at least in part, on the risk. The response action may be based on the level of risk and/or the type of risk in at least some embodiments. In some scenarios, actions may be taken to learn more information (e.g., increase sample rate resolution to get a more accurate reading), in order to select the appropriate prescriptive action to take to address the determined risk.

It should be noted that operations described with reference to FIG. 13 can be performed for each node being monitored in a network by the HME. In some instances, resiliency response actions may be consolidated to address multiple resiliency risks determined to exist in the network based on multiple nodes and/or subnets in the network.

Variations and Implementations

Figure 14:
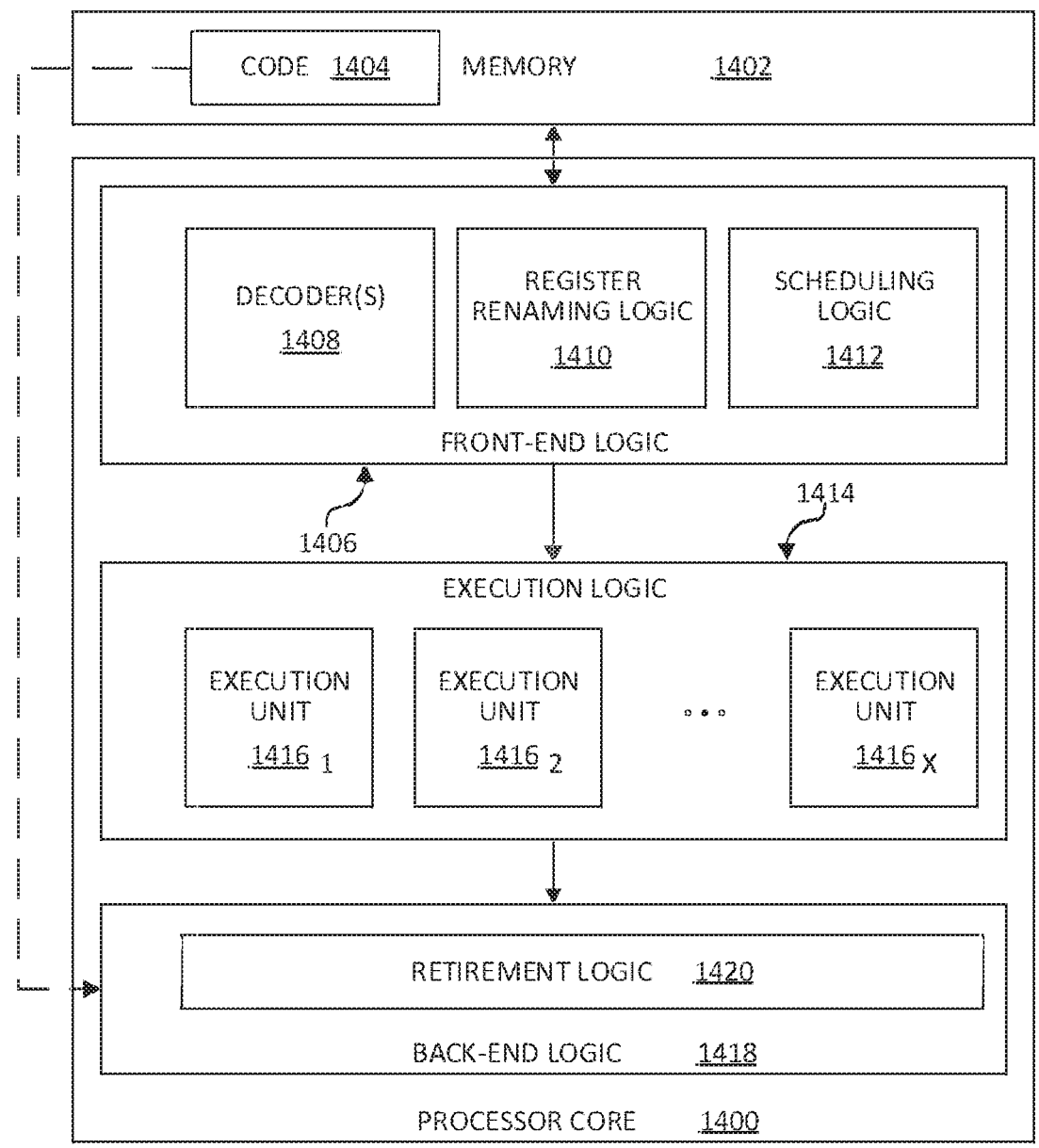
FIG. 14 is a block diagram illustrating an example processor core in accordance with an embodiment.

FIG. 14 is an example illustration of a processor according to an embodiment. Processor 1400 is one example embodiment of processors that may be used in embodiments herein such as processors 47 and 87. Processor 1400 may be any type of processor, such as a microprocessor, an embedded processor, a digital signal processor (DSP), a network processor, a multi-core processor, a single core processor, or other device to execute code. Although only one processor 1400 is illustrated in FIG. 14, a processing element may alternatively include more than one of processor 1400 illustrated in FIG. 14. Processor 1400 may be a single-threaded core or, for at least one embodiment, the processor 1400 may be multi-threaded in that it may include more than one hardware thread context (or "logical processor") per core.

FIG. 14 also illustrates a memory 1402 coupled to processor 1400 in accordance with an embodiment. Memory 1402 is one example of memory elements 49 and 89. Memory 1402 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM). Processor 1400 can execute any type of instructions associated with the monitoring and analyzing operations detailed herein.

Generally, processor 1400 can transform an element or an article (e.g., data) from one state or thing to another state or thing.

Code 1404, which may be one or more instructions to be executed by processor 1400, may be stored in memory 1402. Code 1404 can include instructions of various modules (e.g., device monitoring module 43, network monitoring module 45, monitor 50 and 60-1 through 60-N, health monitoring engine 85, machine learning analysis engine 82, and response module 84) that may be stored in software, hardware, firmware, or any suitable combination thereof, or in any other internal or external component, device, element, or object where appropriate and based on particular needs. In one example, processor 1400 can follow a program sequence of instructions indicated by code 1404. Each instruction enters a front-end logic 1406 and is processed by one or more decoders 1408. The decoder may generate, as its output, a micro operation such as a fixed width micro operation in a predefined format, or may generate other instructions, microinstructions, or control signals that reflect the original code instruction. Front-end logic 1406 also includes register renaming logic 1410 and scheduling logic 1412, which generally allocate resources and queue the operation corresponding to the instruction for execution.

Processor 1400 can also include execution logic 1414 having a set of execution units $1416_1$ through $1416_x$. Some embodiments may include a number of execution units dedicated to specific functions or sets of functions. Other embodiments may include only one execution unit or one execution unit that can perform a particular function. Execution logic 1414 performs the operations specified by code instructions.

After completion of execution of the operations specified by the code instructions, back-end logic 1418 can retire the instructions of code 1404. In one embodiment, processor 1400 allows out of order execution but requires in order retirement of instructions. Retirement logic 1420 may take a variety of known forms (e.g., re-order buffers or the like). In this manner, processor 1400 is transformed during execution of code 1404, at least in terms of the output generated by the decoder, hardware registers and tables utilized by register renaming logic 1410, and any registers (not shown) modified by execution logic 1414.

Although not shown in FIG. 14, a processing element may include other elements on a chip with processor 1400. For example, a processing element may include memory control logic along with processor 1400. The processing element may include I/O control logic and/or may include I/O control logic integrated with memory control logic. The processing element may also include one or more caches. In some embodiments, non-volatile memory (such as flash memory or fuses) may also be included on the chip with processor 1400.

Figure 15:
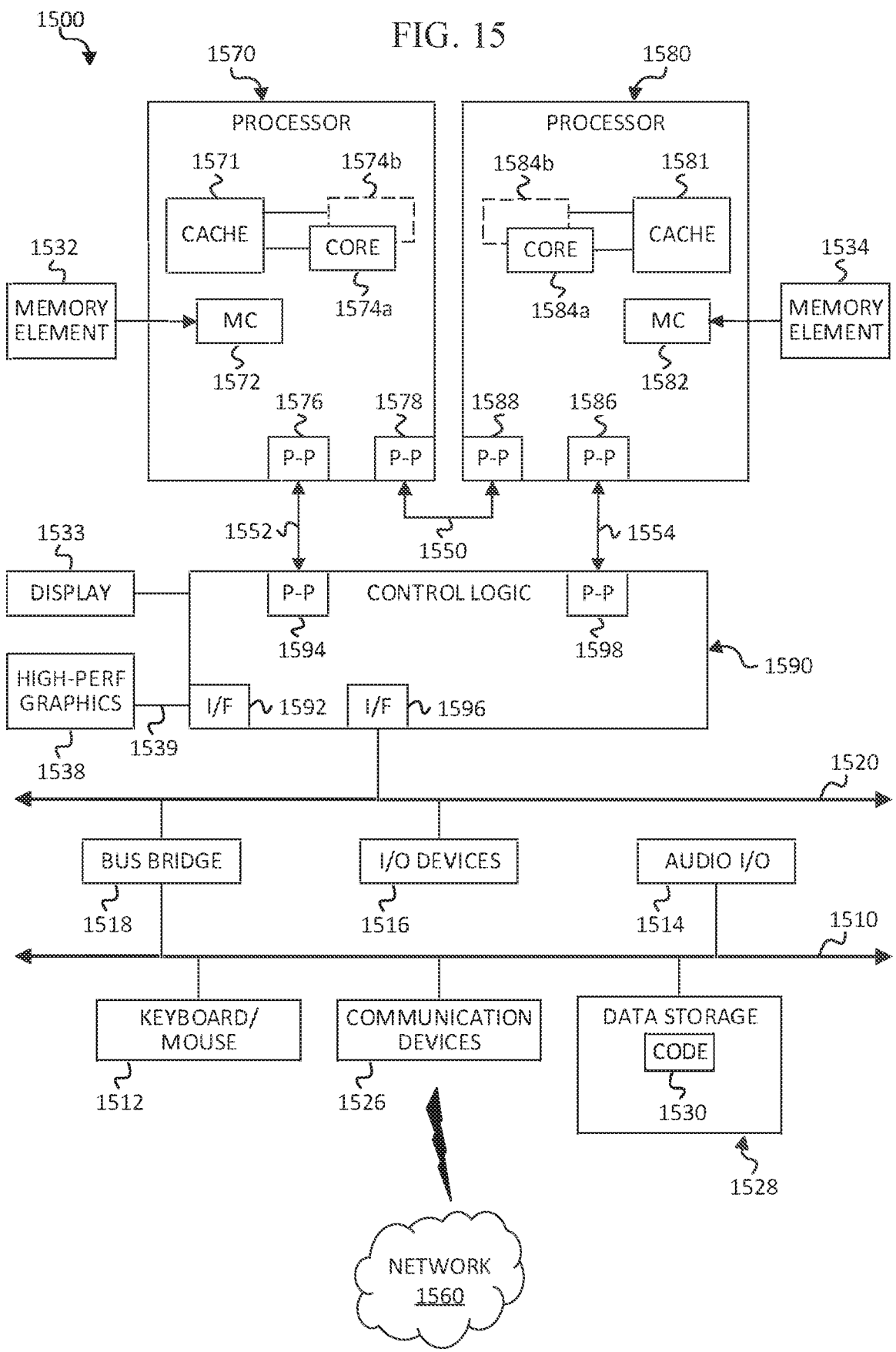
FIG. 15 is a block diagram illustrating an example computing system that is arranged in a point-to-point configuration in accordance with an embodiment.

FIG. 15 illustrates a computing system 1500 that is arranged in a point-to-point (PtP) configuration according to an embodiment. In particular, FIG. 15 shows a system where processors, memory, and input/output devices are interconnected by a number of point-to-point interfaces. Generally, one or more of the computing systems (e.g., network devices, gateways, monitored devices, network elements, etc.) of communication system 100 may be configured in the same or similar manner as computing system 1500. For example, in at least one embodiment, one or more of monitored devices 30-1 through 30-M, network devices 40, 40-1 through 40-N, 60-1 through 60-N, and network device 80 may have the same or similar architecture as computing system 1500.

Processors 1570 and 1580 may also each include integrated memory controller logic (MC) 1572 and 1582 to communicate with memory elements 1532 and 1534, respectively. In alternative embodiments, memory controller logic 1572 and 1582 may be discreet logic separate from processors 1570 and 1580. Memory elements 1532 and/or 1534 may store various data to be used by processors 1570 and 1580 in achieving operations associated with monitoring and analyzing watchdog messages as outlined herein.

Processors 1570 and 1580 may be any type of processor, such as those discussed with reference to processor 1400 of FIG. 14, processor 47 of FIG. 1, and processor 87 of FIG. 11. Processors 1570 and 1580 may exchange data via a point-to-point (PtP) interface 1550 using point-to-point interface circuits 1578 and 1588, respectively. Processors 1570 and 1580 may each exchange data with a control logic 1590 via individual point-to-point interfaces 1552 and 1554 using point-to-point interface circuits 1576, 1586, 1594, and 1598. Control logic 1590 may also exchange data with a high-performance graphics circuit 1538 via a high-performance graphics interface 1539, using an interface circuit 1592, which could be a PtP interface circuit. In alternative embodiments, any or all of the PtP links illustrated in FIG. 15 could be implemented as a multi-drop bus rather than a PtP link. Control logic 1590 may also communicate with a display 1533, for displaying data that is viewable by a human user.

Control logic 1590 may be in communication with a bus 1520 via an interface circuit 1596. Bus 1520 may have one or more devices that communicate over it, such as a bus bridge 1518 and I/O devices 1516. Via a bus 1510, bus bridge 1518 may be in communication with other devices such as a keyboard/mouse 1512 (or other input devices such as a touch screen, trackball, joystick, etc.), communication devices 1526 (such as modems, network interface cards (NICs), or other types of communication devices that may communicate through a computer network 1560), audio I/O devices 1514, and/or a data storage device 1528. Data storage device 1528 may store code 1530, which may be executed by processors 1570 and/or 1580. In alternative embodiments, any portions of the bus architectures could be implemented with one or more PtP links.

Processors 1570 and memory elements 1532, 1534 represent a broad range of processors, memory elements and other memory arrangements, including arrangements with single or multi-core processors of various execution speeds and power consumptions, and memory of various architectures (e.g., with one or more levels of caches) and of various types (e.g., dynamic random access, FLASH, etc.).

The computer system depicted in FIG. 15 is a schematic illustration of an embodiment of a computing system that may be utilized to implement various embodiments discussed herein. It will be appreciated that various components of the system depicted in FIG. 15 may be combined in a system-on-a-chip (SoC) architecture or in any other suitable configuration capable of achieving distributed monitoring and analyzing watchdog messages, according to the various embodiments provided herein. Additionally, any of these components may be partitioned differently than shown or described herein to include greater or fewer integrated circuits still capable of achieving monitoring and analyzing watchdog messages according to the present disclosure.

Figure 16:
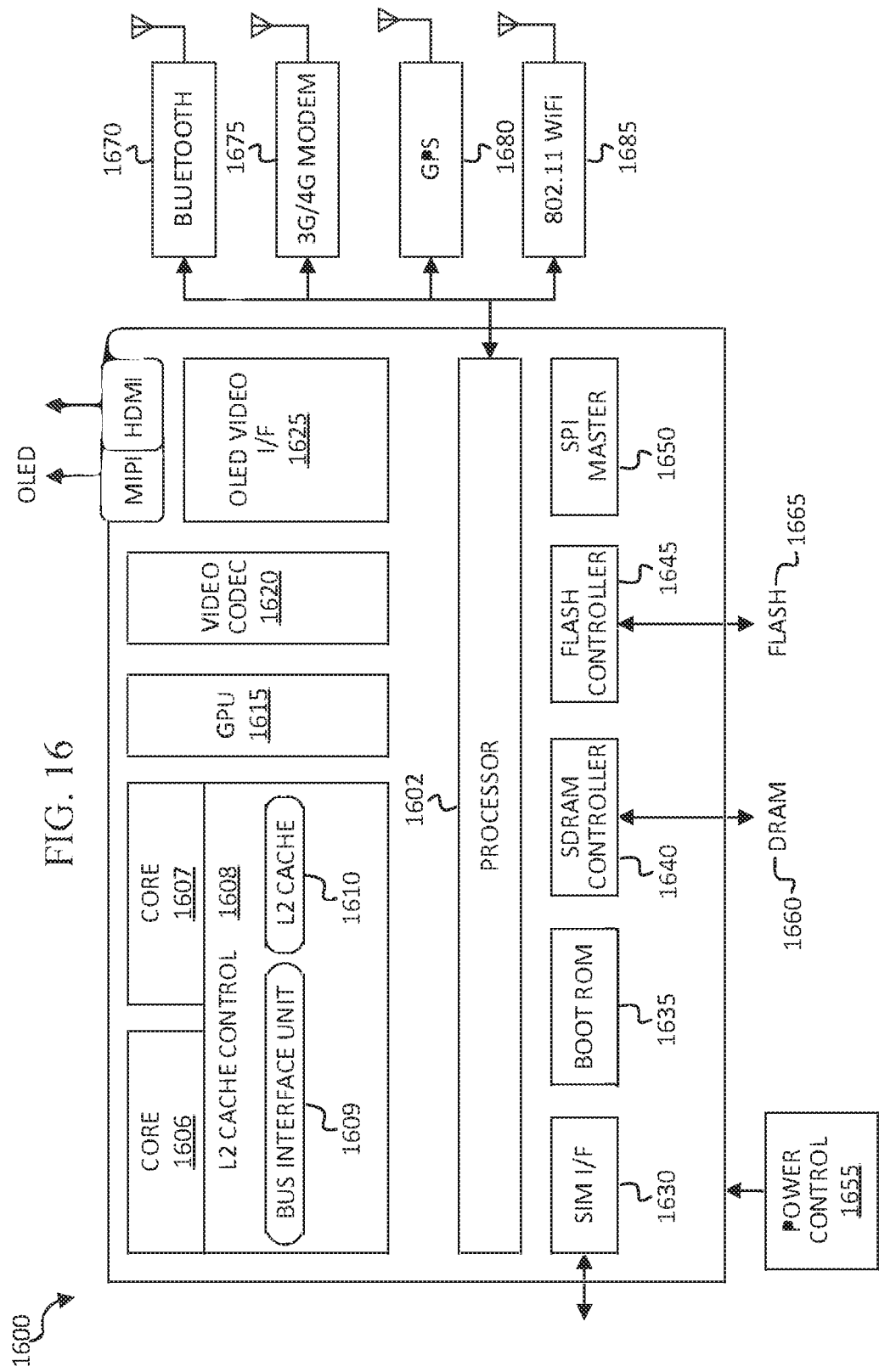
FIG. 16 is a simplified block diagram associated with an example system on chip (SOC) of the present disclosure.

Turning to FIG. 16, FIG. 16 is a simplified block diagram associated with an example SOC 1600 that may be used in embodiments of the present disclosure. At least one example implementation of the present disclosure can include the monitoring and analyzing of watchdog messages, which is discussed herein. In at least some embodiments, some watchdog messages may be generated by SOC 1600 and/or some monitoring and analyzing operations may be performed by SOC 1600. Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 16, SOC 1600 may include multiple cores 1606-1607, an L2 cache control 1608, a bus interface unit 1609, an L2 cache 1610, a graphics processing unit (GPU) 1615, an interconnect 1602, a video codec 1620, and a liquid crystal display (LCD) I/F 1625, which may be associated with mobile industry processor interface (MIPI)/high-definition multimedia interface (HDMI) links that couple to an LCD.

SOC 1600 may also include a subscriber identity module (SIM) I/F 1630, a boot read-only memory (ROM) 1635, a synchronous dynamic random access memory (SDRAM) controller 1640, a flash controller 1645, a serial peripheral interface (SPI) master 1650, a suitable power control 1655, a dynamic RAM (DRAM) 1660, and flash 1665. In addition, one or more example embodiments include one or more communication capabilities, interfaces, and features such as instances of Bluetooth™ 1670, a 3G/4G/nG modem 1675, a global positioning system (GPS) 1680, and an 802.11 Wi-Fi 1685.

In operation, the example of FIG. 16 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

In regards to the internal structure associated with monitoring and analyzing watchdog messages, computing systems such as network devices and monitored devices, can include volatile and/or nonvolatile memory elements (e.g., memory elements 49, 89) for storing data and information, including instructions and/or logic, to be used in the operations outlined herein. Each of the elements may keep data and information in any suitable memory element (e.g., random access memory (RAM), read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, an application specific integrated circuit (ASIC), or other types of nonvolatile machine-readable media that are capable of storing data and information), software, hardware, firmware, or in any other suitable component, device, element, or object where appropriate and based on particular needs. Any of the memory items discussed herein (e.g., memory elements, 49, 89, 1402, 1532, 1534) should be construed as being encompassed within the broad term 'memory element.' Moreover, the information being used, tracked, sent, or received in communication system 100 could be provided in any repository, database, register, queue, table, cache, control list, or other storage structure, all of which can be referenced at any suitable timeframe. Any such storage options (e.g., device filters 42, 300, shadow filters 44, 350, 802-1 through 802-5, policy store 45, subnet filters 46, 812-1 through 812-5, network filter 48, 820, reference template 81, machine learning template 83, etc.) may also be included within the broad term 'memory element' as used herein.

In an example implementation, computing systems of communication system 100, may include software modules (e.g., device monitoring module 43, network monitoring module 45, monitor 50 and 50-1 through 50-N, health monitoring engine 85, machine learning analysis engine 82, response module 84) to achieve, or to foster, operations as outlined herein. These modules may be suitably combined or partitioned in any appropriate manner, which may be based on particular configuration and/or provisioning needs. In some embodiments, one or more of such operations may be carried out by hardware and/or firmware, implemented externally to these elements, or included in some other computing system to achieve the intended functionality. These elements may also include software (or reciprocating software) that can coordinate with other computing devices in order to achieve the operations, as outlined herein.

Additionally, each of computing systems such as network devices and monitored devices of communication system 100 may include a processor (e.g., processors 47, 87, 1400, 1570, 1580) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Note that with the examples provided herein, interaction may be described in terms of two, three, or more elements (e.g., network devices, monitors, monitored devices, health monitoring engine, etc.). However, this has been done for purposes of clarity and example only. In certain cases, it may be easier to describe one or more of the functionalities of a given set of flows by only referencing a limited number of elements. It should be appreciated that communication system 100 and its teachings are readily scalable and can accommodate a large number of components, as well as more complicated/sophisticated arrangements and configurations. Additionally, one or more of these elements (e.g., in FIGS. 1 and 10-11) may be combined or removed from the architecture based on particular configuration needs. Accordingly, the examples provided should not limit the scope or inhibit the broad teachings of communication system 100 as potentially applied to a myriad of other architectures.

While FIGS. 1 and 10-11 are described as containing or being associated with a plurality of elements, not all elements illustrated within communication system 100 of FIG. 1 may be utilized in each alternative implementation of the present disclosure. Additionally, one or more of the elements described herein may be located externally relative to network 10 or subnets 20-1 through 20-N, while in other instances, certain elements may be included within or as a portion of one or more of the other described elements, as well as other elements not described in the illustrated implementation. Further, certain elements illustrated in FIGS. 1 and 10-11 may be combined with other components, as well as used for alternative or additional purposes in addition to those purposes described herein.

It is also important to note that the operations in the preceding flowcharts and interaction diagrams (i.e., FIGS. 4-7, 9A-9B and 12-13) illustrate only some of the possible monitoring and analyzing activities that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by embodiments of communication system 100 in that any suitable arrangements, chronologies, configurations, and timing mechanisms may be provided without departing from the teachings of the present disclosure.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. Additionally, although communication system 100 has been illustrated with reference to particular elements and operations that facilitate the network monitoring and analyzing activities, these elements and operations may be replaced by any suitable architecture, protocols, and/or processes that achieve the intended functionality of communication system 100.

Other Notes and Examples

Note that all optional features of the apparatuses and systems described above may also be implemented with respect to the method or process described herein and specifics in the examples may be used anywhere in one or more embodiments. The following examples pertain to embodiments in accordance with this specification.

There is disclosed in one example a network device, comprising: a hardware platform comprising at least a processor and a memory; a communication interface; and stored instructions on the memory to instruct the processor to provide a health monitoring engine (HME) configured to: communicatively couple to a network via the network interface; construct a reference template during a training period; observe watchdog behavior on the network during an observation period; identify an abnormality in the watchdog behavior comprising a substantial variance from the reference template; and trigger a resilience response to the substantial variance.

There is further disclosed an example of a network device, wherein observing watchdog behavior comprises processing heartbeat messages.

There is further disclosed an example of a network device, wherein the heartbeat messages comprise information related to a network node or subnet that produced the heartbeat message, the information comprising at least one of a device identifier (ID), a local time stamp, a next heartbeat message time, node health information, and node or subnet diagnostic information.

There is further disclosed an example of a network device, wherein observing watchdog behavior on the network comprises operating a machine learning analysis engine to construct the reference template based at least in part on heartbeat messages that nodes or subnets in the network are configured to report.

There is further disclosed an example of a network device, wherein the machine learning analysis engine is further to measure differences between actual characteristics of heartbeat messages from a node or subnet and expected heartbeat patterns for the node or subnet.

There is further disclosed an example of a network device, wherein the characteristics include at least one of heartbeat message arrival time, latency, anomalies due to work patterns, time of day, and site specific patterns.

There is further disclosed an example of a network device, wherein the HME comprises a machine learning analysis engine to identify a threshold of substantial variance from the reference template.

There is further disclosed an example of a network device, wherein identifying an abnormality further comprises identifying a threshold exceeding the variance.

There is further disclosed an example of a network device, wherein the resilience response includes at least one of notification, repair, and deployment of network redundancy.

There is further disclosed an example of a network device, wherein constructing the reference template during the training period comprises applying a data model description of expected behavior of a message traffic system.

There is further disclosed an example of a network device, further comprising logic for the device to act as a network gateway to an internet of things network.

There are also disclosed in an example one or more tangible, non-transitory computer-readable mediums having stored thereon executable instructions to provide a health monitoring engine (HME) configured to: communicatively couple to an internet of things (IoT) network; train a machine learning algorithm, comprising constructing a reference template; monitor watchdog behavior on the IoT network; identify watchdog behavior on the IoT network varying, beyond a threshold, from the reference template; and activate a resilience response to protect IoT network health.

There are further disclosed in an example one or more tangible, non-transitory computer-readable mediums, wherein monitoring watchdog behavior comprises processing heartbeat messages.

There are further disclosed in an example one or more tangible, non-transitory computer-readable mediums, wherein the heartbeat messages comprise information related to an IoT device or subnet that produced the heartbeat message, the information comprising at least one of a device identifier (ID), a local time stamp, a next heartbeat message time, node health information, and node or subnet diagnostic information.

There are further disclosed in an example one or more tangible, non-transitory computer-readable mediums, wherein monitoring watchdog behavior on the IoT network comprises operating a machine learning analysis engine to construct the reference template based at least in part on heartbeat messages that IoT devices or subnets in the network are configured to report.

There are further disclosed in an example one or more tangible, non-transitory computer-readable mediums, wherein the machine learning analysis engine is further to measure differences between actual characteristics of heartbeat messages from an IoT device or subnet and expected heartbeat patterns for the IoT device or subnet.

There are further disclosed in an example one or more tangible, non-transitory computer-readable mediums, wherein the characteristics include at least one of heartbeat message arrival time, latency, anomalies due to work patterns, time of day, and site-specific patterns.

There are further disclosed in an example one or more tangible, non-transitory computer-readable mediums, wherein the HME comprises a machine learning analysis engine to compute the threshold from the reference template.

There are further disclosed in an example one or more tangible, non-transitory computer-readable mediums, wherein the resilience response includes at least one of notification, repair, and deployment of network redundancy.

There are further disclosed in an example one or more tangible, non-transitory computer-readable mediums, wherein constructing the reference template comprises applying a data model description of expected behavior of a message traffic system.

There are further disclosed in an example one or more tangible, non-transitory computer-readable mediums, further comprising instructions to instruct the processor to act as an IoT gateway.

There is also disclosed in one example a computer-implemented method of providing a health monitoring engine (HME), comprising: communicatively coupling to an internet of things (IoT) network; training a machine learning algorithm, comprising constructing a reference template; monitoring behavior on the IoT network; identifying behavior on the IoT network that does not conform to the reference template; and activating a resilience response.

There is further disclosed an example of a method, wherein monitoring behavior comprises processing heartbeat messages.

There is further disclosed an example of a method, wherein the heartbeat messages comprise information related to an IoT device or subnet that produced the heartbeat message, the information comprising at least one of a device identifier (ID), a local time stamp, a next heartbeat message time, node health information, and node or subnet diagnostic information.

There is further disclosed an example of a method, wherein monitoring behavior on the IoT network comprises operating a machine learning analysis engine to construct the reference template based at least in part on heartbeat messages that IoT devices or subnets in the network are configured to report.

There is further disclosed an example of a method, wherein the machine learning analysis engine is further to measure differences between actual characteristics of heartbeat messages from an IoT device or subnet and expected heartbeat patterns for the IoT device or subnet.

There is further disclosed an example of a method, wherein the characteristics include at least one of heartbeat message arrival time, latency, anomalies due to work patterns, time of day, and site-specific patterns.

There is further disclosed an example of a method, further comprising operating a machine learning analysis engine to compute a threshold for identifying behavior on the IoT network that does not conform to the reference template.

There is further disclosed an example of a method, wherein the resilience response includes at least one of notification, repair, and deployment of network redundancy.

There is further disclosed an example of a method, wherein constructing the reference template comprises applying a data model description of expected behavior of a message traffic system.

There is further disclosed an example of a method, further comprising acting as an IoT gateway.

What is claimed is:

1. A network device, comprising:
   a hardware platform comprising at least a processor and a memory;
   a communication interface; and
   stored instructions on the memory to instruct the processor to:
   communicatively couple to a network via the communication interface;
   construct a reference template during a defined training period,. wherein constructing the reference template comprises applying a machine learning (ML) algorithm to observed heartbeat patterns received from a plurality of network nodes during the training period;
   observe watchdog behavior on the network during an observation period after the defined training period, the watchdog behavior including a plurality of heartbeat messages from the plurality of nodes during the observation period;
   identify an abnormality in the watchdog behavior comprising a substantial variance from the reference template; and
   trigger a resilience response to the substantial variance.

2. The network device of claim 1, wherein observing watchdog behavior comprises processing heartbeat messages.

3. The network device of claim 2, wherein the heartbeat messages comprise information related to a network node or subnet that produced the heartbeat message, the information comprising at least one of a device identifier (ID), a local time stamp, a next heartbeat message time, node health information, and node or subnet diagnostic information.

4. The network device of claim 1, wherein the instructions are further to measure differences between actual characteristics of heartbeat messages from a node or subnet and expected heartbeat patterns for the node or subnet.

5. The network device of claim 4, wherein the characteristics include at least one of heartbeat message arrival time, latency, anomalies due to work patterns, time of day, and site-specific patterns.

6. The network device of claim 1, wherein the instructions are further to provide a machine learning analysis engine to identify a threshold of substantial variance from the reference template.

7. The network device of claim 6, wherein identifying an abnormality further comprises identifying a threshold exceeding the measured differences.

8. The network device of claim 1, wherein the resilience response includes at least one of notification, repair, and deployment of network redundancy.

9. The network device of claim 1, wherein constructing the reference template during the defined training period comprises applying a data model description of expected behavior of a message traffic system.

10. The network device of claim 1, further comprising logic for the device to act as a network gateway to an internet of things network.

11. One or more tangible, non-transitory computer-readable mediums having stored thereon executable instructions to provide a health monitoring engine (HME) configured to:
communicatively couple to an internet of things (IoT) network;
during a defined training period, train a machine learning (ML) algorithm, comprising observing heartbeat patterns received from a plurality of IoT devices on the IoT network, and using the ML algorithm to construct a reference template based on the observed heartbeat patterns;
monitor watchdog behavior on the IoT network during an observation period after the defined training period, the watchdog behavior including a plurality of heartbeat messages from a plurality of device nodes;
identify watchdog behavior on the IoT network varying, beyond a threshold, from the reference template; and
activate a resilience response to protect IoT network health.

12. The one or more tangible, non-transitory computer-readable mediums of claim 11, wherein monitoring watchdog behavior comprises processing heartbeat messages.

13. The one or more tangible, non-transitory computer-readable mediums of claim 12, wherein the heartbeat messages comprise information related to an IoT device or subnet that produced the heartbeat message, the information comprising at least one of a device identifier (ID), a local time stamp, a next heartbeat message time, node health information, and node or subnet diagnostic information.

14. The one or more tangible, non-transitory computer-readable mediums of claim 11, wherein monitoring watchdog behavior on the IoT network comprises operating a machine learning analysis engine to construct the reference template based at least in part on heartbeat messages that IoT devices or subnets in the IoT network are configured to report.

15. The one or more tangible, non-transitory computer-readable mediums of claim 14, wherein the machine learning analysis engine is further to measure differences between actual characteristics of heartbeat messages from an IoT device or subnet and expected heartbeat patterns for the IoT device or subnet.

16. The one or more tangible, non-transitory computer-readable mediums of claim 15, wherein the characteristics include at least one of heartbeat message arrival time, latency, anomalies due to work patterns, time of day, and site-specific patterns.

17. A computer-implemented method of providing a health monitoring engine (HME), comprising:
communicatively coupling to an internet of things (IoT) network;
during a defined training period, training a machine learning (ML) algorithm, comprising observing a plurality of heartbeat messages received during the defined training period, and operating the ML algorithm to construct a reference template based on the heartbeat messages observed during the defined training period;
monitoring behavior on the IoT network during an observation period after the defined training period, including observing a plurality of heartbeat messages from a plurality of device nodes during the observation period;
identifying behavior on the IoT network that does not conform to the reference template; and
activating a resilience response.

18. The method of claim 17, wherein monitoring behavior comprises processing heartbeat messages.

19. The method of claim 18, wherein the heartbeat messages comprise information related to an IoT device or subnet that produced the heartbeat message, the information comprising at least one of a device identifier (ID), a local time stamp, a next heartbeat message time, node health information, and node or subnet diagnostic information.

* * * * *

UNITED STATES PATENT AND TRADEMARK OFFICE
CERTIFICATE OF CORRECTION

| | | |
|---|---|---|
| PATENT NO. | : 11,385,951 B2 | |
| APPLICATION NO. | : 16/260923 | |
| DATED | : July 12, 2022 | |
| INVENTOR(S) | : Smith et al. | |

It is certified that error appears in the above-identified patent and that said Letters Patent is hereby corrected as shown below:

On the Title Page

On page 2, item (56) under "Other Publications" in Column 2, Line 10, delete "Computerand" and insert -- Computer and --, therefor.

In the Claims

In Column 36, Claim 1, Line 28, delete "period." and insert -- period, --, therefor.

Signed and Sealed this
Twentieth Day of September, 2022

Katherine Kelly Vidal
*Director of the United States Patent and Trademark Office*